US010166697B2

(12) United States Patent
Ciuperca

(10) Patent No.: US 10,166,697 B2
(45) Date of Patent: *Jan. 1, 2019

(54) INSULATED FLYING TABLE CONCRETE FORM, ELECTRICALLY HEATED FLYING TABLE CONCRETE FORM AND METHOD OF ACCELERATING CONCRETE CURING USING SAME

(71) Applicant: Romeo Ilarian Ciuperca, Atlanta, GA (US)

(72) Inventor: Romeo Ilarian Ciuperca, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/864,159

(22) Filed: Jan. 8, 2018

(65) Prior Publication Data

US 2018/0126589 A1 May 10, 2018

Related U.S. Application Data

(63) Continuation of application No. 14/480,967, filed on Sep. 9, 2014, now Pat. No. 9,862,118.

(60) Provisional application No. 61/875,168, filed on Sep. 9, 2013.

(51) Int. Cl.
*B28B 7/00* (2006.01)
*B28B 11/24* (2006.01)
*B28B 17/00* (2006.01)
*C04B 40/04* (2006.01)

(52) U.S. Cl.
CPC .......... *B28B 7/0032* (2013.01); *B28B 11/245* (2013.01); *B28B 17/0081* (2013.01); *C04B 40/04* (2013.01)

(58) Field of Classification Search
CPC .......... B28B 1/14; B28B 7/34; B28B 7/0032; B28B 7/36; B28B 11/245; B28B 17/0081; E04G 9/10; E04G 9/04; E04G 9/05; E04G 11/08; E04G 11/10; E04G 2009/028
See application file for complete search history.

(56) References Cited

U.S. PATENT DOCUMENTS

| 2,667,680 | A | * | 2/1954 | Sato | ........................ | E04G 11/10 |
| | | | | | | 249/189 |
| 3,596,351 | A | * | 8/1971 | Tilton | ....................... | H05B 3/00 |
| | | | | | | 249/78 |

(Continued)

*Primary Examiner* — James M Ference
(74) *Attorney, Agent, or Firm* — Robert E. Richards; Richards IP Law

(57) ABSTRACT

The invention comprises a flying table concrete form. The flying table concrete form comprises a concrete forming deck comprising a first concrete forming panel having a first primary surface adapted for forming and contacting plastic concrete and a second primary surface opposite the first primary surface, a layer of insulating material contacting and substantially covering the second primary surface of the first concrete forming panel, and a second panel contacting and substantially covering the layer of insulating material. The flying table concrete form also comprises a plurality of deck support members extending transversely with respect to the second panel, wherein the first concrete forming panel defines a plane and wherein no portion of the deck support members are in the plane defined by the first concrete forming panel. A method of using the flying table concrete form is also disclosed.

13 Claims, 12 Drawing Sheets

(56) References Cited

U.S. PATENT DOCUMENTS

| | | | | |
|---|---|---|---|---|
| 3,847,340 A | * | 11/1974 | Ficken | E04G 11/10 |
| | | | | 249/18 |
| 3,905,574 A | * | 9/1975 | Brauer | E04G 11/10 |
| | | | | 249/191 |
| 3,962,841 A | * | 6/1976 | Carroll | E04B 7/00 |
| | | | | 428/312.4 |
| 5,930,965 A | * | 8/1999 | Carver | E04B 5/29 |
| | | | | 264/31 |
| 2003/0170093 A1 | * | 9/2003 | Janeway | B28B 23/005 |
| | | | | 411/548 |
| 2006/0179787 A1 | * | 8/2006 | Bilowol | E04G 9/02 |
| | | | | 52/741.11 |
| 2009/0173870 A1 | * | 7/2009 | Long, Sr. | E04G 11/18 |
| | | | | 249/16 |

* cited by examiner

INSULATED FLYING TABLE CONCRETE FORM, ELECTRICALLY HEATED FLYING TABLE CONCRETE FORM AND METHOD OF ACCELERATING CONCRETE CURING USING SAME

CROSS-REFERENCE TO RELATED APPLICATIONS

The present application is a continuation of application Ser. No. 14/480,967 filed Sep. 9, 2014, now U.S. Pat. No. 9,862,118, which claims the benefit of the filing date of U.S. provisional patent application Ser. No. 61/875,168 filed Sep. 9, 2013.

FIELD OF THE INVENTION

The present invention generally relates to a form for cement-based materials. More particularly, this invention relates to a concrete flying table form, particularly an insulated flying table form. The present invention also relates to an electrically heated flying table form. The present invention also relates to a method of curing concrete by retaining the heat of hydration. The present invention also relates to a method for accelerating concrete curing using an insulated flying table form or an electrically heated flying table form. The present invention also relates to a method of curing concrete with reduced amounts of portland cement, which produces a concrete that cures faster and is stronger and more durable.

BACKGROUND OF THE INVENTION

Concrete is a composite material usually comprising a mineral-based hydraulic binder which acts to adhere mineral particulates together in a solid mass; those particulates may consist of coarse aggregate (rock or gravel), fine aggregate (natural sand or crushed fines), and/or unhydrated or unreacted cementitious or pozzolanic material. Concrete typically is made from portland cement ("PC"), water and aggregate. Curing concrete requires two elements: suitable temperature and water. To achieve maximum strength, all cement particles must be hydrated. The initial process of hydration is exothermic; it generates a considerable amount of energy called the "heat of hydration." Fluid (plastic) concrete is poured in various forms or molds. These prior art uninsulated forms are exposed to the environment, and, therefore, the energy from the heat of hydration is generally lost to the environment in the first 8-36 hrs. In the next few days, most of the free moisture is also lost from the concrete. Therefore, the two elements required to fully hydrate the cement are often lost during the initial stage of concrete curing. Thus, the cement may never fully hydrate, and, therefore, may never achieve its maximum strength. Industry practice indicates that portland cement concrete achieves 90% of its maximum strength under ideal curing conditions in about 28 days.

Portland cement manufacture causes environmental impacts at all stages of the process. During manufacture, a metric ton of $CO_2$ is released for every metric ton of portland cement made. Worldwide $CO_2$ emissions from portland cement manufacture amount to about 5%-7% of total $CO_2$ emissions. The average energy input required to make one ton of portland cement is about 4.7 million Btu—the equivalent of about 418 pounds of coal. The production of portland cement is therefore highly energy intensive, accounting for about 2% of primary energy consumption globally. In 2010 the world production of hydraulic cement was about 3,300 million tons.

Concrete can also be made with slag cement ("SC") and various other pozzolans, such as fly ash ("FA"), but are not frequently used. Slag cement and fly ash generate relatively low amounts of heat of hydration, which result in extremely slow setting times and strength gain. Slag cement and fly ash can be mixed with portland cement but industry practice in building construction limits use of slag cement and fly ash to no more than 30% replacement of portland cement and only during warm weather conditions. Concrete made with slag cement and fly ash may take up to 90 days to achieve 80%-90% of maximum strength. Mass concrete structures use more slag cement and fly ash, replacing up to 80% of portland cement, as a means to reduce the heat of hydration to reduce cracking. Slag cement and fly ash use less water to hydrate, may have finer particles than portland cement and produce concretes that achieve higher compressive and flexural strength. Such concrete is also less permeable, and, therefore, structures built with slag cement and fly ash have far longer service lives or lifecycle.

Slag cement is obtained by quenching molten iron slag (a by-product of iron and steel-making) from a blast furnace in water or steam, to produce a glassy, granular product that is then dried and ground into a fine powder. Slag cement manufacture uses only 15% of the energy needed to make portland cement. Since slag cement is made from waste materials; no virgin materials are required and the amount of landfill space otherwise used for disposal is reduced. For each metric ton of pig iron produced, approximately ⅓ metric ton of slag is produced. In 2009, worldwide pig iron production was about 1.211 billion tons. There was an estimated 400 million tons of slag produced that could potentially be made into slag cement. However, only a relatively small percentage of slag is used to make slag cement in the USA.

Fly ash is a by-product of the combustion of pulverized coal in electric power generation plants. When pulverized coal is ignited in a combustion chamber, the carbon and volatile materials are burned off. However, some of the mineral impurities of clay, shale, feldspars, etc. are fused in suspension and carried out of the combustion chamber in the exhaust gases. As the exhaust gases cool, the fused materials solidify into spherical glassy particles called fly ash. The quantity of fly ash produced worldwide is growing along with the steady global increase in coal use. According to Obada Kayali, a civil engineer at the University of New South Wales Australian Defense Force Academy, only 9% of the 600 million tons of fly ash produced worldwide in 2000 was recycled and even smaller amount used in concrete; most of the rest is disposed of in landfills. Since fly ash is a waste product, no additional energy is required to make it.

Concrete can also be made from a combination of portland cement and pozzolanic material or from pozzolanic material alone. There are a number of pozzolans that historically have been used in concrete. A pozzolan is a siliceous or siliceous and aluminous material which, in itself, possesses little or no cementitious value but which will, in finely divided form and in the presence of water, react chemically with calcium hydroxide at ordinary temperatures to form compounds possessing cementitious properties (ASTM C618). The broad definition of a pozzolan imparts no bearing on the origin of the material, only on its capability of reacting with calcium hydroxide and water. The general definition of a pozzolan embraces a large number of materials, which vary widely in terms of origin, composition and properties. Both natural and artificial (man-made) materials show pozzolanic activity and are used as supplementary cementitious materials. Artificial pozzolans can be produced deliberately, for instance by thermal activation of kaolin-clays to obtain metakaolin, or can be obtained as waste or by-products from high-temperature process, such as fly ashes from coal-fired electricity production. The most commonly used pozzolans today are industrial by-products, such as slag cement (ground granulated blast furnace slag), fly ash, silica fume from silicon smelting, highly reactive metakaolin, and burned organic matter residues rich in silica, such as rice husk ash. Alternatives to the established pozzolanic by-products are to be found on the one hand in an expansion of the range of industrial by-products or societal waste considered and on the other hand in an increased usage of naturally occurring pozzolans. Silica fume (also known as microsilica) is an amorphous form of silicon dioxide. Silica fume consists of sub-micron spherical primary particles.

Natural pozzolans are abundant in certain locations and are used as an addition to portland cement in some countries. The great majority of natural pozzolans in use today are of volcanic origin. Volcanic ashes and pumices largely composed of volcanic glass are commonly used, as are deposits in which the volcanic glass has been altered to zeolites by interaction with alkaline waters. Deposits of sedimentary origin are less common. Diatomaceous earths, formed by the accumulation of siliceous diatom microskeletons, are a prominent source material here. Romans used volcanic ash mixed with lime to make concrete over 2,000 years ago.

Concrete walls, and other concrete structures and objects, traditionally are made by building a form or a mold. The forms and molds are usually made from wood, plywood, metal and other structural members. Unhardened (plastic) concrete is poured into the space defined by opposed spaced form members. Once the concrete hardens sufficiently, although not completely, the forms are removed leaving a concrete wall or other concrete structure, structural member or concrete object exposed to ambient temperatures. Concrete forms are typically made of various types of plywood or metal supported and/or reinforced by a frame structure. These forms are not insulated which means that concrete contained in such forms is exposed to the elements during the curing process. During the curing process, the heat generated by the hydration of cement is lost to the environment. This often makes the curing of the concrete a slow process and the ultimate strength difficult to control or predict. To compensate for these losses and increase the rate of setting and strength development, larger amounts of portland cement are used than otherwise would be necessary.

The curing of plastic concrete requires two elements, water and heat, to fully hydrate the cementitious material. Cement hydration is an exothermic process. This heat is produced by the hydration of the portland cement, or other pozzolanic or cementitious materials, that make up the concrete paste. Initially, the hydration process produces a relatively large amount of heat. Concrete placed in conventional forms (i.e., uninsulated forms) loses this heat of hydration to the environment in a very short time, generally in the first 8-36 hours, depending on the ambient temperature. Also, concrete placed in conventional forms may not reach its maximum potential temperature. As the hydration process proceeds, relatively less heat of hydration is generated due to slowing reaction rates. At the same time, moisture in the concrete is lost to the environment. If one monitors the temperature of concrete during the curing process, it produces a relatively large increase in temperature, which then decreases relatively rapidly over time. This chemical reaction is temperature dependent. That is, the hydration process, and consequently the strength gain, proceeds faster at higher temperature and slower at lower temperature. In conventional forms, both heat and moisture are lost in a relatively short time, which makes it difficult, or impossible, for the cementitious material to fully hydrate, and, therefore, the concrete may not achieve its maximum potential strength.

Conventional forms or molds provide little or no insulation to the concrete contained therein. Therefore, heat produced within the concrete form or mold due to the hydration process usually is lost through a conventional concrete form or mold relatively quickly. Thus, the temperature of the plastic concrete may initially rise 20 to 40° C., or more, above ambient temperature due to the initial hydration process and then fall relatively quickly to ambient temperature, such as within 8 to 36 hours depending on the climate and season and size of the concrete element. This initial relatively large temperature drop may result in significant concrete shrinkage and/or thermal effects which can lead to concrete cracking. The remainder of the curing process is then conducted at approximately ambient temperatures, because the relatively small amount of additional heat produced by the remaining hydration process is relatively quickly lost through the uninsulated concrete form or mold. The concrete is therefore subjected to the hourly or daily fluctuations of ambient temperature from hour-to-hour, from day-to-night and from day-to-day. Failure to cure the concrete under ideal temperature and moisture conditions affects the ultimate strength and durability of the concrete. In colder weather, concrete work may even come to a halt since concrete will freeze, or not gain much strength at all, at relatively low temperatures. By definition (ACI 306), cold weather conditions exist when " . . . for more than 3 consecutive days, the average daily temperature is less than 40 degrees Fahrenheit and the air temperature is not greater than 50 degrees Fahrenheit for more than one-half of any 24 hour period." Therefore, in order for hydration to take place, the temperature of concrete must be above 40 ° F.; below 40° F., the hydration process slows and at some point may stop altogether. Under conventional forming and curing methods, the concrete takes a relatively long time to fully hydrate the cementitious materials. Since both the initial heat and moisture are quickly lost in conventional forms, it is typically recommended that concrete by moisture cured for 28 days to fully hydrate the concrete. However, moisture curing for 28 days is seldom possible to administer in commercial practice. Therefore, concrete poured in various applications in conventional forms seldom develops it maximum potential strength and durability.

Insulated concrete form systems are known in the prior art and typically are made from a plurality of modular form members. U.S. Pat. Nos. 5,497,592; 5,809,725; 6,668,503; 6,898,912 and 7,124,547 (the disclosures of which are all incorporated herein by reference in their entirety) are exemplary of prior art modular insulated concrete form systems. Full-height insulated concrete forms are also known in the prior art. U.S. Patent Application Publication No. 2011/0239566 and 2013/007432 (the disclosures of which are both incorporated herein by reference in their entirety) disclose full-height insulated concrete forms. However, prior art insulated concrete forms are designed to remain in place on the concrete structure. And, conventional removable concrete forms are not insulated and therefore cannot retain the heat of hydration.

In the art of construction, a great variety of concrete forms are used. One common form is a horizontal deck form for pouring concrete flooring in multi-story or high-rise buildings. To add another floor to the building, a deck form is placed on top of the previously poured concrete floor, walls or columns. Concrete is then poured on top of the deck form to construct the next floor level. Such forms are usually called "flying tables" or "truss tables" because, after the new floor has set, the form is lowered away from the new concrete floor/ceiling, transported to the edge of the building, and "flown" to the floor above to support another concrete pour. Normally, flying tables are constructed with a metal truss, the truss being supported by jack stands or telescoping legs resting on a support surface, such as the previously poured floor. To move the flying table, the truss is lowered on the jack stands or telescoping legs and the entire form is moved on rollers to the edge of the building where it is picked up by a crane and flown to the next floor. Various flying table forms are disclosed in U.S. Pat. Nos. 4,036,466; 4,790,113; 4,831,797; 5,273,415; 5,560,160; 6,176,463; and 7,708,916 (the disclosures of which are all incorporated herein by reference) and U.S. Patent Application Pub. No. 2007/0094962 (the disclosure of which is incorporated herein by reference in its entirety). Flying tables are also commercially available from a number of sources. Examples of commercially available flying table form include, but are not limited to, DokaTruss table from Doka USA Ltd., Little Ferry, N.J.; Skydeck from Peri Formwork Systems, Inc. USA, Elkridge, Md.; Fly Form System from Atlas Sales, Honolulu, Hi.; Aluma Hi-Flyer from Brans Energy Solutions, Pasadena, Tex.; Panel Deck Supporting System from Concrete Support Systems, LLC, Naples, Fla.; Flying Truss Formwork from EFCO, Des Moines, Iowa; and A-Frame Fly Forms from NCS Forming, Inc., Las Vegas, Nev. Although the design of the supporting trusses for the foregoing flying tables vary considerably, the common element is the supported deck form. The deck form is typically made from the same type of material used for vertical concrete forms; i.e., wood, plywood, or metal, such as steel or aluminum. In order to protect concrete poured on a deck form from freezing, industry practice is typically to enclose the periphery of the building with plastic sheeting at the floor below the flying table and to use propane heaters to heat the air of such lower floor. Operating such propane heaters is both expensive and inefficient.

Due to the quick-setting properties required for flying table forms, concrete mixes employing reduced amounts of portland cement and/or relatively large amounts of supplementary cementitious or pozzolanic materials are not used for flying table concrete forming processes.

SUMMARY OF THE INVENTION

The present invention satisfies the foregoing needs by providing an improved flying table forming system to retain the heat of hydration of curing concrete.

In one disclosed embodiment, the present invention comprises a flying table concrete form. The flying table concrete form comprises a concrete forming deck comprising a first concrete forming panel having a first primary surface adapted for forming and contacting plastic concrete and a second primary surface opposite the first primary surface, a layer of insulating material contacting and substantially covering the second primary surface of the first concrete forming panel and a second panel contacting and substantially covering the layer of insulating material. The flying table concrete form also comprises a plurality of deck support members extending transversely with respect to the second panel, wherein the first concrete forming panel defines a plane and wherein no portion of the deck support members are in the plane defined by the first concrete forming panel.

In another disclosed embodiment, the present invention comprises a method. The method comprises placing a quantity of plastic concrete on a horizontal concrete forming deck comprising a first concrete forming panel having a first primary surface adapted for forming and contacting plastic concrete and a second primary surface opposite the first primary surface, a layer of insulating material contacting and substantially covering the second primary surface of the first concrete forming panel and a second panel contacting and substantially covering the layer of insulating material. The horizontal concrete forming deck also comprises a plurality of deck support members extending transversely with respect to the second panel, wherein the first concrete forming panel defines a plane and wherein no portion of the deck support members are in the plane defined by the first concrete forming panel. The method also comprises substantially covering the quantity of plastic concrete with an insulating blanket and leaving the insulating blanket on the quantity of plastic concrete for a time sufficient for the quantity of plastic concrete to at least partially cure.

Therefore, it is an object of the present invention to provide an improved flying table form and concrete forming system.

Another object of the present invention is to provide a flying table form that can be used in the same manner as conventional prior art flying table forms.

A further object of the present invention is to provide a method of curing concrete by retaining the heat of hydration within the concrete thereby accelerating the hydration and curing of cementitious materials to achieve concrete with improved properties.

Another object of the present invention is to provide an improved method for curing concrete by more fully hydrating the cementitious material before needed heat and moisture are lost to the environment.

Another object of the present invention is to provide a system for curing concrete such that the concrete develops its maximum strength as early as possible.

A further object of the present invention is to provide a concrete curing system that uses reduced amounts of portland cement while producing concrete having an ultimate strength equivalent to concrete made with conventional amounts of portland cement.

Another object of the present invention is to provide a concrete curing system that substantially reduces the use of portland cement while producing concrete having an ultimate strength equivalent to concrete made with conventional amounts of portland cement.

A further object of the present invention is to provide a concrete curing system that uses relatively large amounts of recycled industrial waste material, such as slag cement, fly ash, silica fume, pulverized glass and/or rice husk ash, while producing concrete having an ultimate strength equivalent to, or better than, concrete made with conventional amounts of portland cement.

A further object of the present invention is to provide a concrete curing system that uses relatively large amounts of recycled industrial waste material, such as slag cement, fly ash, silica fume, pulverized glass and/or rice husk ash, in combination with inert or filler material, such as ground limestone, calcium carbonate, titanium dioxide, or quartz, while producing concrete having an ultimate strength equivalent to, or better than, concrete made with conventional amounts of portland cement.

Another object of the present invention is to provide a system for curing concrete such that concrete mixes containing reduced amounts of portland cement can be cured efficiently and effectively therein while having compressive strengths equivalent to, or better than, conventional concrete mixes.

A further object of the present invention is to provide a concrete curing system that uses pozzolanic materials as a partial, or full, replacement for portland cement, while producing concrete having an ultimate strength equivalent to, or better than, concrete made with conventional amounts of portland cement.

A further object of the present invention is to provide a concrete curing system that uses artificial pozzolans, such as fly ash, metakaolin, rice husk ash and silica fume, as a partial, or full, replacement for portland cement, while producing concrete having an ultimate strength equivalent to, or better than, concrete made with conventional amounts of portland cement.

A further object of the present invention is to provide a concrete curing system that uses natural pozzolans, such as volcanic ash similar to the Roman concrete, as a partial, or full, replacement for portland cement, while producing concrete having an ultimate strength equivalent to, or better than, concrete made with conventional amounts of portland cement.

Yet another object of the present invention is to provide a system for curing concrete such that the concrete develops its maximum durability.

Another object of the present invention is to provide a system for curing concrete more quickly.

Another object of the present invention is to provide an insulated concrete deck form for use with a flying table form that provides insulation for conductive heat loss.

Another object of the present invention is to provide an insulated concrete deck form for use with a flying table form that provides insulation for radiant heat loss. A further object of the present invention is to provide an electrically heated concrete deck form for use with a flying table form.

Another object of the present invention is to provide a flying table form that reduces the amount of heat loss from concrete contained within the form.

Another object of the present invention it is provide heat to concrete as it is being formed using a flying table form so that the temperature of the concrete follows a predetermined temperature profile.

These and other objects, features and advantages of the present invention will become apparent after a review of the following detailed description of the disclosed embodiments and the appended drawing and claims.

DETAILED DESCRIPTION OF THE DISCLOSED EMBODIMENTS

Figure 1:
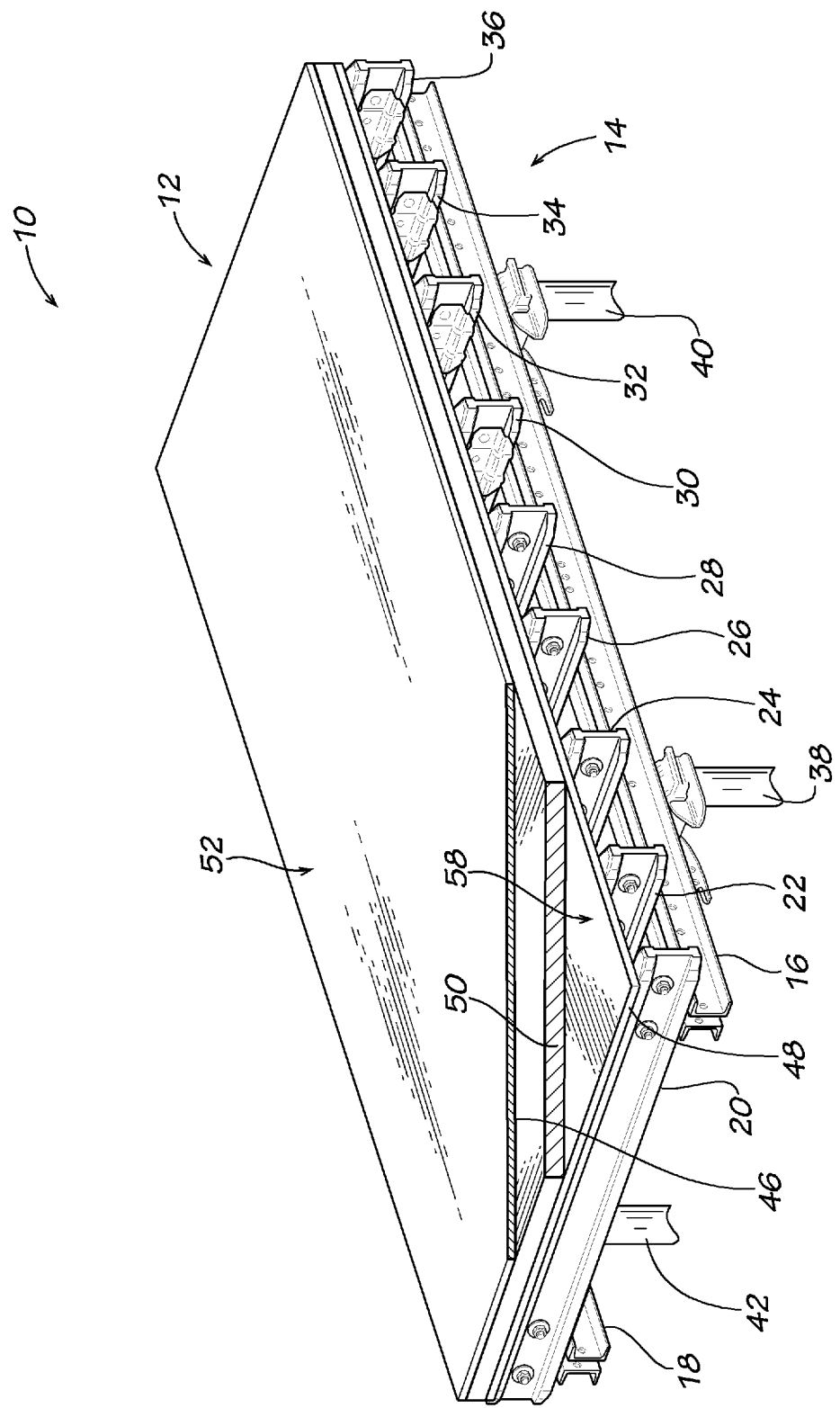
FIG. 1 is a partially broken away perspective view of a disclosed embodiment of an insulated concrete deck form used with a flying table form in accordance with the present invention.
Figure 2:
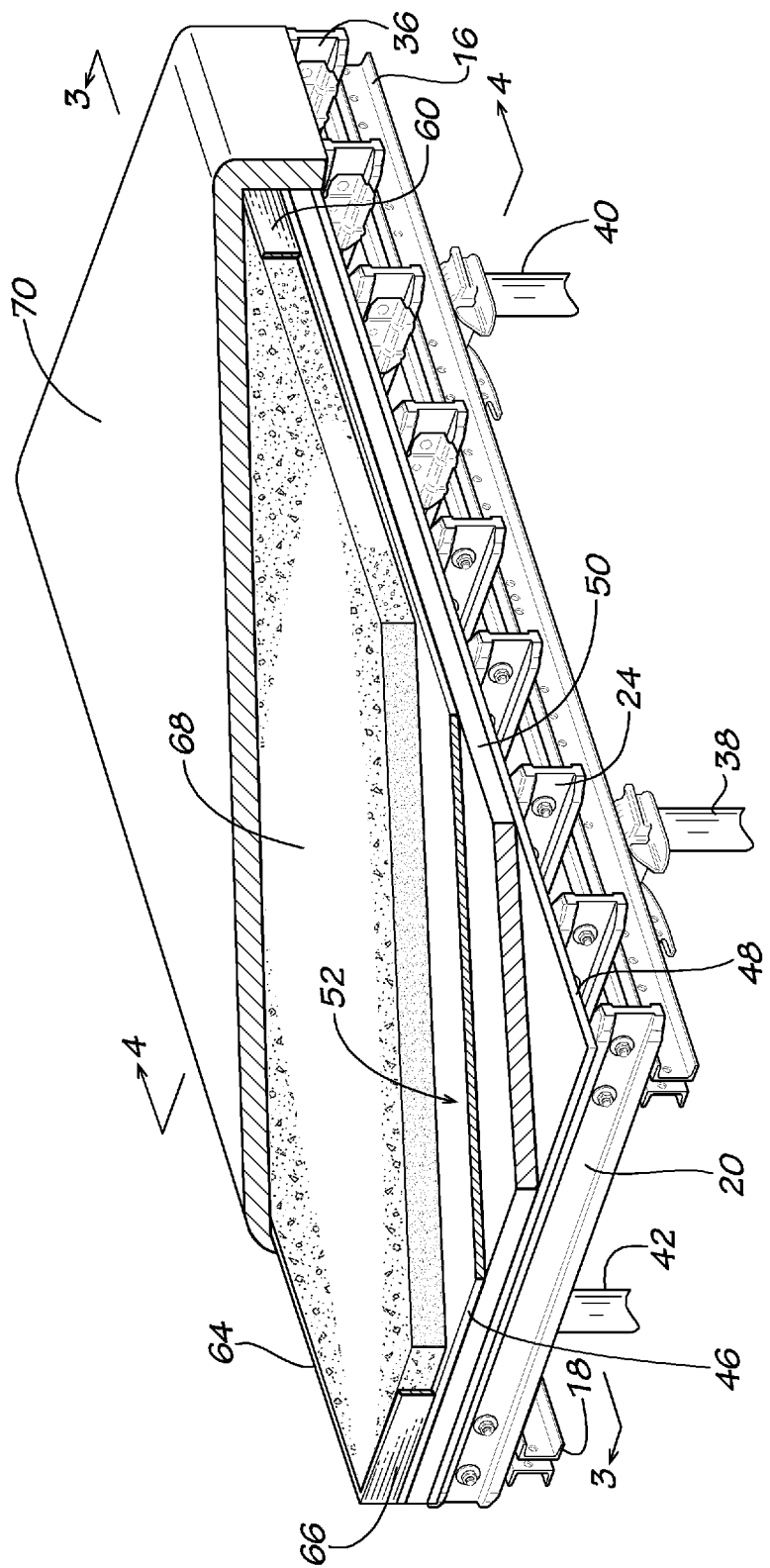
FIG. 2 is a partially broken away perspective view of the insulated concrete flying table form shown in FIG. 1 showing the use of a layer of insulating material on top of the concrete layer.
Figure 3:
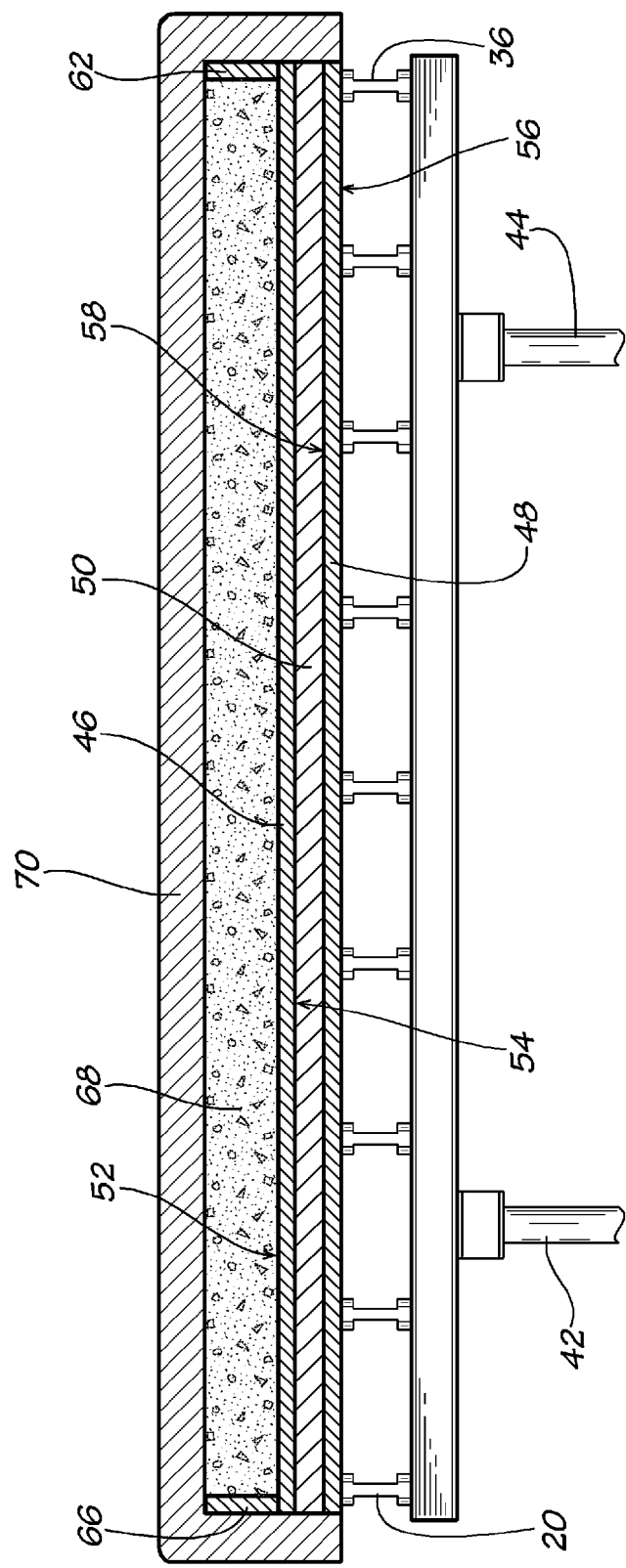
FIG. 3 is a cross-sectional view taken along the line 3-3 of the insulated flying table form shown in FIG. 2.
Figure 4:
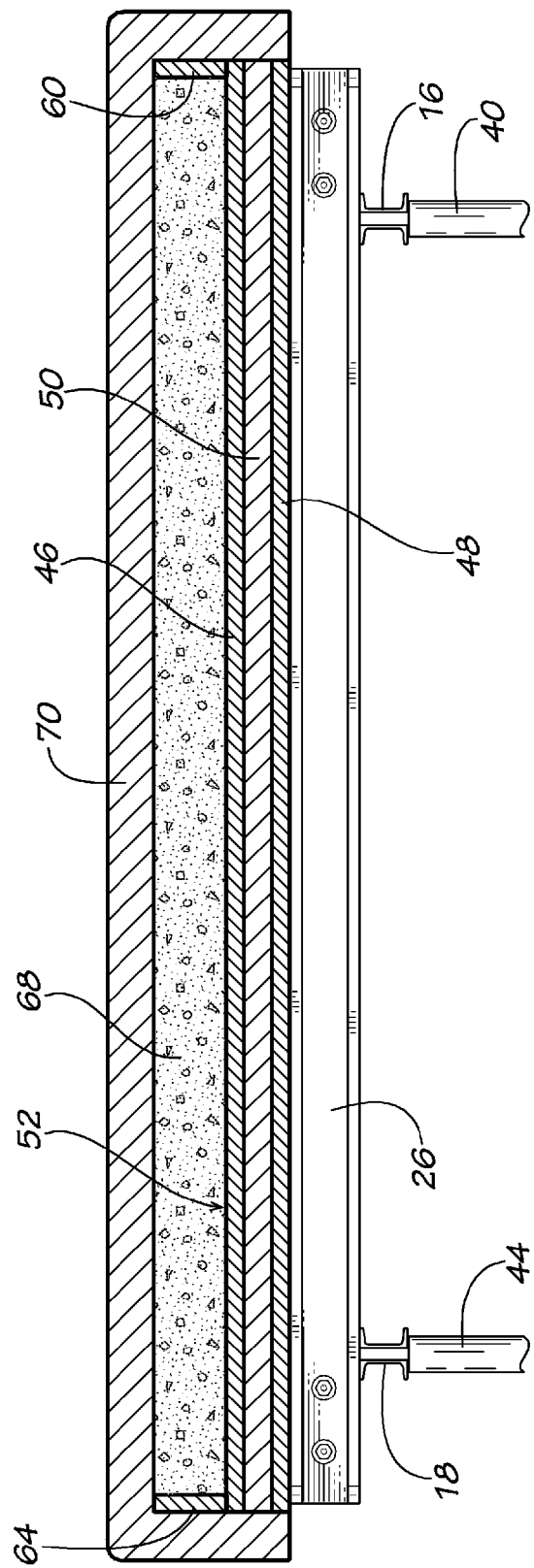
FIG. 4 is a cross-sectional view taken along the line 4-4 of the insulated concrete flying table form shown in FIG. 2.

Referring now to the drawing in which like numbers indicate like elements throughout the several views, there is shown in FIG. 1 an insulated flying table form 10 in accordance with the present invention. The insulated flying table form 10 comprises a rectangular concrete forming deck 12 and a deck support structure 14. The deck support structure comprises a pair of elongate, longitudinally extending beams 16, 18 that are laterally spaced from each other. The beams 16, 18 are sometimes referred to as the top chord. The deck support structure also comprises a plurality of elongate, transversely extending support beams 20, 22, 24, 26, 28, 30, 32, 34, 36. The support beams 20-36 are attached to the top chord beams 16, 18 by any suitable means known in the prior art, such as by bolting. The deck 12 is attached to the support beams 20-36 by any suitable means known in the prior art, such as by bolding or nailing. The top chord beams 16, 18 are attached to a plurality of adjustable trusses or shore posts 38, 40, 42, 44. The bottoms (not shown) of the shore post 38-44 include screw jacks (not shown) for adjusting the height of the shore posts. As stated above, there are many different designs for the shore posts 38-44 and deck support structure 14 that supports the deck 12 and they are all suitable for use with the present invention. However, the particular design of the deck support structure 14 and shore post 38-44 is not a critical part of the present invention. It is only necessary that such deck support structure 14 and shore post 38-44 are sufficiently strong to support the deck 12 and the weight of the concrete intended to be placed on the deck 12 and that the deck support structure and shore posts provide the features required such that the deck and deck support structure can be used as a flying table form, such as being height adjustable. The inventive aspect of the present invention does not pertain to the design of the deck support structure 14 or the shore posts 38-44 individually. The inventive aspect of the present invention resides in the design and use of the deck 12 and the design and use of the deck as a portion of a flying table form.

The deck 12 comprises a concrete forming face or first panel 46, a second panel 48 and a layer of insulating material 50 disposed between the first and second panels. The first panel 46 is made of any suitable material typically used in prior art concrete forms or any other material (or composite material) that is sufficiently strong to withstand the hydrostatic pressure of plastic concrete applied to it. The concrete forming first panel 46 can be made from any suitable material including, but not limited to, wood, plywood, high density overlay (HDO) plywood, wood composite materials, wood or composite materials with polymer coatings, plastic, plastic composites, fiberglass board, resin board and metal, such as steel or aluminum. The first panel 46 is preferably made from conductive heat insulating material or a poor heat conducting material. A preferred material for the first panel 46 is a sheet of high density overlay (HDO) plywood. The first panel 46 can be any useful thickness depending on the anticipated loads to which the form will be subjected. However, plywood thicknesses of ⅛ inch to ⅞ inches can be used. The first panel 46 has a first primary surface 52 for contacting plastic concrete and an opposite second primary surface 54. The first primary surface 52 is usually smooth and flat and is designed for contacting plastic concrete. The first primary surface 52 can also optionally include a polymer coating to make the surface smoother, more durable and/or provide better release properties. The first panel 46 defines a plane. Optionally, but preferably, there is a second panel 48 that is the same size as the first panel 46. The second panel 48 can be made from the same material as the first panel 46, or it can be made from a different material. The second panel 48 can be the same thickness as the first panel 46, or it can be a different thickness, either thicker or thinner depending on the strength requirements of the deck 12. The second panel 48 has a first primary surface 56 and an opposite second primary surface 58. Preferably, no portion of the support beams 20-36 is in the plane defined by the first panel 46. Preferably there is no substantial thermal bridging between the first panel 46 and the second panel 48. Preferably there is no substantial thermal bridging between the first panel 46 and the support beams 20-36. As used herein the term "thermal bridging" means direct contact with a material having heat conducting properties equivalent to metal, such as steel or aluminum. As used herein the term "no substantial thermal bridging" means no more thermal bridging than would be associated with attaching the first panel 46 to the second panel 48 and/or attaching the first panel to the support beams 20-36, such as by screws or nails or similar connectors.

It is typical for wood, plywood or wood composite panels used for concrete forming panels to include a polymer coating on the surface that contacts the concrete. This provides better concrete release properties to the panel. It is a part of the present invention that a polymer coating is optionally applied to the first primary surface 52 of the concrete forming first panel 46 and that the polymer coating includes heat insulating materials, such as refractory insulating materials. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. It is a part of the present invention that a polymer coating is optionally applied to the first primary surface 52 of the concrete forming first panel 46 and that the polymer coating includes heat reflective materials. Heat reflective materials are made from materials including, but not limited to, mica, aluminum flakes, magnetite, graphite, carbon, other types of silicates and combinations thereof. The above heat reflective materials can be used in any number ways and combination percentages, not just as a single element added to the polymeric material. The heat reflective elements can also be used in conjunction with the ceramic fibers mentioned above in any number of ways and percentage combinations. The heat insulating materials and/or the heat reflective materials can be added to the polymeric material used to coat the first primary surface 52 of the concrete forming first panel 46 in amounts of approximately 0.1% to approximately 50% by weight heat reflective elements, preferably approximately 0.1% to approximately 40% by weight, more preferably approximately 0.1% to approximately 30% by weight, most preferably approximately 0.1% to approximately 20% by weight, especially approximately 0.1% to approximately 15% by weight, more especially approximately 0.1% to approximately 10% by weight, most especially approximately 0.1% to approximately 5% by weight. The polymeric material used to coating the first primary surface 14 of the concrete forming first panel 12 includes, but is not limited to, polyethylene (PE), poly(ethylene terephthalate) (PET), polypropylene (PP), polyvinyl chloride (PVC), chlorinated polyvinyl chloride (CPVC), acrylonitrile butadiene styrene (ABS), polycarbonate, polystyrene, nylon, urethane, polyurethane (PU), polyisocyanurate, phenol, polyimide, acrylic polymers such as polyacrylate, poly(methyl methacrylate) (PMMA), latex polymers, epoxy resin and the like.

As stated above, disposed between the first panel 46 and second panel 48 is a layer of insulating material 50. The layer of insulating material 50 covers, or substantially covers, the second primary surface 54 of the first panel 46 and the second primary surface 58 of the second panel 48. As used herein the term "substantially covers" means covering at least 80% of the surface area of the second primary surface 54, 58 of the first and/or second panels 46, 48. The layer of insulating material 50 is made from any suitable material providing heat insulating properties, preferably a sheet of closed cell polymeric foam. The layer of insulating material 50 is preferably made from closed cell polymeric foams including, but not limited to, polyvinyl chloride, urethane, polyurethane, polyisocyanurate, phenol, polyethylene, polyimide or polystyrene. Such foam sheet preferably has a density of 1 to 3 pounds per cubic foot, or more. The layer of insulating material 50 preferably has insulating properties equivalent to at least 0.25 inches of expanded polystyrene foam, preferably equivalent to at least 0.5 inches of expanded polystyrene foam, preferably equivalent to at least 1 inch of expanded polystyrene foam, more preferably equivalent to at least 2 inches of expanded polystyrene foam, more preferably equivalent to at least 3 inches of expanded polystyrene foam, most preferably equivalent to at least 4 inches of expanded polystyrene foam, especially equivalent to at least 8 inches of expanded polystyrene foam. There is no maximum thickness for the layer of insulting material equivalent to expanded polystyrene foam useful in the present invention. The maximum thickness is usually dictated by economics, weight, ease of handling and building and structure design. However, for most applications a maximum insulating equivalence of 8 inches of expanded polystyrene foam can be used. In another embodiment of the present invention, the layer of insulating material 50 has insulating properties equivalent to approximately 0.25 to approximately 8 inches of expanded polystyrene foam, preferably approximately 0.5 to approximately 8 inches of expanded polystyrene foam, preferably approximately 1 to approximately 8 inches of expanded polystyrene foam, preferably approximately 2 to approximately 8 inches of expanded polystyrene foam, more preferably approximately 3 to approximately 8 inches of expanded polystyrene foam, most preferably approximately 4 to approximately 8 inches of expanded polystyrene foam. These ranges for the equivalent insulating properties for the layer of insulating material 50 include all of the intermediate values. Thus, the layer of insulating material 50 used in another disclosed embodiment of the present invention has insulating properties equivalent to approximately 0.25 inches of expanded polystyrene foam, approximately 0.5 inches of expanded polystyrene foam, approximately 1 inch of expanded polystyrene foam, approximately 2 inches of expanded polystyrene foam, approximately 3 inches of expanded polystyrene foam, approximately 4 inches of expanded polystyrene foam, approximately 5 inches of expanded polystyrene foam, approximately 6 inches of expanded polystyrene foam, approximately 7 inches of expanded polystyrene foam, or approximately 8 inches of expanded polystyrene foam. Expanded polystyrene foam has an R-value of approximately 4 to 6 per inch thickness. Therefore, the layer of insulating material 50 should have an R-value of greater than 1.5, preferably greater than 4, more preferably greater than 8, most preferably greater than 12, especially greater than 20, more especially greater than 30, most especially greater than 40. The layer of insulating material 50 preferably has an R-value of approximately 1.5 to approximately 40; more preferably between approximately 4 to approximately 40; especially approximately 8 to approximately 40; more especially approximately 12 to approximately 40. The layer of insulating material 50 preferably has an R-value of approximately 1.5, more preferably approximately 4, most preferably approximately 8, especially approximately 20, more especially approximately 30, most especially approximately 40.

The layer of insulating material 50 can also be made from a refractory insulating material, such as a refractory blanket, a refractory board or a refractory felt or paper. Refractory insulation is typically used to line high temperature furnaces or to insulate high temperature pipes. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. Refractory insulating material is commercially available in various forms including, but not limited to, bulk fiber, foam, blanket, board, felt and paper form. Refractory insulation is commercially available in blanket form as Fiberfrax Durablanket® insulation blanket from Unifrax I LLC, Niagara Falls, N.Y., USA and RSI4-Blank and RSI8-Blank from Refractory Specialties Incorporated, Sebring, Ohio, USA. Refractory insulation is commercially available in board form as Duraboard® from Unifrax I LLC, Niagara Falls, N.Y., USA and CS85, Marinite and Transite boards from BNZ Materials Inc., Littleton, Colo., USA. Refractory insulation in felt form is commercially available as Fibrax Felts and Fibrax Papers from Unifrax I LLC, Niagara Falls. The refractory insulating material can be any thickness that provides the desired insulating properties, as set forth above. There is no upper limit to the thickness of the refractory insulating material; this is usually dictated by economics and weight. However, refractory insulating material useful in the present invention can range from $\frac{1}{32}$ inch to approximately 2 inches. Similarly, ceramic fiber materials including, but not limited to, silica, silicon carbide, alumina, aluminum silicate, aluminum oxide, zirconia, calcium silicate; glass fibers, mineral wool fibers, Wollastonite and fireclay, can be suspended in a polymer, such as polyurethane, latex, cement or epoxy, and used as a coating or a polymeric foam to create a refractory insulating material layer, for example covering, or substantially covering, one or both of the second primary surfaces 54, 58 of the first or second panels 46, 48, respectively, or both. Such a refractory insulating material layer can be used as the layer of insulating material 50 to block excessive ambient heat loads and retain the heat of hydration of concrete within the insulated flying table form 10 of the present invention. Ceramic fibers suspended in a polymer binder, such as latex, are commercially available as Super Therm®, Epoxotherm and HPC Coating from Superior Products, II, Inc., Weston, Fla., USA.

The layer of insulating material 50 is preferably a multi-layer material with a first layer of refractory insulating material and a second layer of closed cell polymeric foam insulating material. The layer of insulating material 50 more preferably comprises a layer of ceramic fibers suspended in a polymer, especially a polymeric foam including, but not limited to, polystyrene foam, polyurethane foam, polyisocyanurate foam, latex foam or any other suitable type of polymeric foam.

The first and second panels 46, 48 are preferably made from rigid sheets of wood, plywood, metal, plastic, fibers or composite materials. The first and second panels 46, 48 are preferably made from the same material. However, it is also contemplated that one of the first and second panels 46, 48 can be made from one of wood, plywood, metal, plastic, fibers or composite materials and the other made from a different one of wood, plywood, metal, plastic, fibers or composite materials. Suitable metals include, but are not limited to, steel and aluminum. In the present embodiment, it is preferred that the first and second panels 46, 48 be made from a conductive heat insulating material or a material that conducts heat relatively poorly. Therefore, for this embodiment, the use of metal for the first and/or second panels 46, 48 is not preferred.

Suitable plastics include, but are not limited to, polyethylene (PE), poly(ethylene terephthalate) (PET), polypropylene (PP), polyvinyl chloride (PVC), chlorinated polyvinyl chloride (CPVC), acrylonitrile butadiene styrene (ABS), polycarbonate, polystyrene, nylon, urethane, polyurethane (PU), polyisocyanurate, phenol, polyimide, acrylic polymers such as polyacrylate, poly(methyl methacrylate) (PMMA), and the like. Fiberboard is a type of engineered wood product that is made out of wood fibers. Composite materials include fiberglass board, which is a laminated product of glass and epoxy resin and other laminates. Fiberglass boards are commercially available from Owens Corning, Monsey, N.Y.; Current, Inc., East Have, CT and under the designation Exact-O-Board from Pacor, Inc., Bordentown, N.J. Other composite laminates include laminated products comprised of layers of cloth or paper with thermosetting resins cured under elevated pressure and temperature.

A particularly preferred plastic sheet for use as the first and/or second panels 46, 48 is corrugated plastic. Corrugated plastic sheet typically comprises two planar plastic sheets spaced from each other but connected to each other by a plurality of small I-beam formed plastic connections. The I-beam formed plastic connections between the planar sheets of plastic can be either perpendicular to the planar sheets of plastic or slanted. Corrugated plastic sheets can also be made by sandwiching a fluted sheet of plastic between two flat sheets of plastic (also called facings). The sheets can be joined together by gluing. The corrugated plastic sheet can be single wall corrugated sheet, double wall corrugated sheets or triple wall corrugated sheets. The layer of insulating material 50 can then be applied to one or both of the corrugated sheet that form the first and second panels 46, 48 or the layer of insulating material can be adhered to one or both of the corrugated sheets.

In another disclosed embodiment, if the corrugations of a corrugated plastic sheet are large enough; e.g., approximately 0.5 inches between the facings, the two facings of the corrugated sheet can be use as the first and second panels 46, 48. The layer of insulating material 50 then preferably can be injected between the two facings and between the corrugations. In this case, the layer of insulating material 50 is preferably foamed liquid plastic or a liquid plastic that blows in situ to form a foam. The foamed liquid plastic or a liquid plastic that blows in situ is then allowed to set and cure inside the corrugated plastic sheet. A corrugated metal sheet can also be used in the present invention and made in the same manner as the corrugated plastic sheet, as described above.

In another disclosed embodiment a first plastic sheet can be laid on a work surface. A layer of plastic foam, or a layer of liquid plastic that blows in situ, can then be deposited on the first plastic sheet. A second plastic sheet can then be disposed on the layer of plastic foam or the layer of liquid plastic that blows in situ. After the layer of plastic foam, or the layer of liquid plastic that blows in situ, is deposited between the first and second plastic sheets, or after the layer of liquid plastic blows in situ has blown (i.e., expanded), the first and second plastic sheets can be gauged to a desired thickness, such as by passing the first and second plastic sheets between a pair of spaced gauge rollers. After the first and second plastic sheets have been gauged to a desired thickness, the layer of plastic foam or the layer of liquid plastic that blows in situ is allowed to cure. If necessary, the sandwich of the first and second plastic sheets with the layer of plastic foam in between can be cut to a desired size and/or shape.

In another disclosed embodiment, a first metal sheet can be laid on a work surface. A layer of plastic foam, or a layer of liquid plastic that blows in situ, can then be deposited on the first metal sheet. A second metal sheet can then be disposed on the layer of plastic foam, or a layer of liquid plastic that blows in situ after the liquid plastic is blown (i.e., expanded). Before the layer of plastic foam, or the blown layer of liquid plastic, sets up, the first and second metal sheets can be gauged to a desired thickness, such as by passing the first and second metal sheets between a pair of spaced gauge rollers. After the first and second metal sheets have been gauged to a desired thickness, the layer of plastic foam, or the blown layer of liquid plastic, is allowed to cure. If necessary, the sandwich of the first and second metal sheets with the layer of plastic foam in between can be cut to a desired size and/or shape. Any of the foregoing plastic foams can have ceramic fibers suspended therein, so as to an efficient conductive heat insulating and radiant heat reflective material.

Optionally, the layer of insulating material 50 can include a layer of radiant heat reflective material. Preferably, the layer of insulating material 50 is made from a layer of conductive heat insulating material and a layer of radiant heat reflective material. The layer of radiant heat reflective material can be made from any suitable material that reflects radiant heat, such as metal foil, especially aluminum foil, or a metalized polymeric film, more preferably, metalized biaxially-oriented polyethylene terephthalate film, especially aluminized biaxially-oriented polyethylene terephthalate film. Biaxially-oriented polyethylene terephthalate film is commercially available under the designation Mylar®, Melinex® and Hostaphen®. Mylar® film is typically available in thicknesses of approximately 1 mil or 2 mil. Aluminized Mylar® film is commercially available from the Cryospares division of Oxford Instruments Nanotechnology Tools Ltd., Abingdon, Oxfordshire, United Kingdom and from New England Hydroponics, Southampton, Mass., USA.

Use of the insulated flying table form 10 will now be considered. A particular advantage of the present invention is that the insulated flying table form 10 can be used in the same manner as a conventional prior art flying table form. The insulated flying table form 10 is erected at a desired location. Of course, multiple deck forms 12 can be joined together to form a deck of a desired size and shape with a corresponding supporting structure 14 of an appropriate size to support the multiple deck forms. For example, a plurality of deck forms 12 are attached end-to-end to form a deck form 21 feet wide and 100 feet long. In such a form, the top chord beams 16, 18 are also 100 feet long and sufficient transverse beams, such as the beams 20-36, are added on top of the top chord beams to form a supporting structure for the multiple deck forms 12.

After the insulated flying table form 10 is erected in a desired location, side form members 60, 62, 64, 66 are positioned as desired on the first primary surface 52 of the first panel 46. Plastic concrete 68 is then placed on the first primary surface 52 of the first panel 46 so as to fill the form to a desired depth or thickness, such as up to the top of the side form members 60-66. The surface of the plastic concrete is finished in any desired manner. Then, as soon as practical, a layer of insulating material 70 is placed over the curing plastic concrete 68 and preferably overhanging the side form members 60-66. The layer of insulating material 70 is made from any suitable material providing conductive heat insulating properties, preferably a sheet of closed cell polymeric foam. The layer of insulating material 70 is preferably made from closed cell foams of polyvinyl chloride, urethane, polyurethane, polyisocyanurate, phenol, polyethylene, polyimide or polystyrene. Such foam preferably has a density of 1 to 3 pounds per cubic foot, or more. The layer of insulating material 70 preferably has insulating properties equivalent to at least 0.25 inches of expanded polystyrene foam, preferably equivalent to at least 0.5 inches of expanded polystyrene foam, preferably equivalent to at least 1 inch of expanded polystyrene foam, more preferably equivalent to at least 2 inches of expanded polystyrene foam, more preferably equivalent to at least 3 inches of expanded polystyrene foam, most preferably equivalent to at least 4 inches of expanded polystyrene foam, especially equivalent to at least 8 inches of expanded polystyrene foam. There is no maximum thickness for the layer of insulting material 70 equivalent to expanded polystyrene foam useful in the present invention. The maximum thickness is usually dictated by economics, weight, ease of handling and building or structure design.

However, for most applications a maximum insulating equivalence of 8 inches of expanded polystyrene foam can be used. In another embodiment of the present invention, the layer of insulating material 70 has insulating properties equivalent to approximately 0.25 to approximately 8 inches of expanded polystyrene foam, preferably approximately 0.5 to approximately 8 inches of expanded polystyrene foam, preferably approximately 1 to approximately 8 inches of expanded polystyrene foam, preferably approximately 2 to approximately 8 inches of expanded polystyrene foam, more preferably approximately 3 to approximately 8 inches of expanded polystyrene foam, most preferably approximately 4 to approximately 8 inches of expanded polystyrene foam. These ranges for the equivalent insulating properties for the layer of insulating material 70 include all of the intermediate values. Thus, the layer of insulating material 70 used in another disclosed embodiment of the present invention has insulating properties equivalent to approximately 0.25 inches of expanded polystyrene foam, approximately 0.5 inches of expanded polystyrene foam, approximately 1 inch of expanded polystyrene foam, approximately 2 inches of expanded polystyrene foam, approximately 3 inches of expanded polystyrene foam, approximately 4 inches of expanded polystyrene foam, approximately 5 inches of expanded polystyrene foam, approximately 6 inches of expanded polystyrene foam, approximately 7 inches of expanded polystyrene foam, or approximately 8 inches of expanded polystyrene foam. Expanded polystyrene foam has an R-value of approximately 4 to 6 per inch thickness. Therefore, the layer of insulating material 70 should have an R-value of greater than 1.5, preferably greater than 4, more preferably greater than 8, most preferably greater than 12, especially greater than 20, more especially greater than 30, most especially greater than 40. The layer of insulating material 70 preferably has an R-value of approximately 1.5 to approximately 40; more preferably between approximately 4 to approximately 40; especially approximately 8 to approximately 40; more especially approximately 12 to approximately 40. The layer of insulating material 70 preferably has an R-value of approximately 1.5, more preferably approximately 4, most preferably approximately 8, especially approximately 20, more especially approximately 30, most especially approximately 40.

The layer of insulating material 70 can also be made from a refractory insulating material, such as a refractory blanket, a refractory board or a refractory felt or paper. Refractory insulation is typically used to line high temperature furnaces or to insulate high temperature pipes. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. Refractory insulating material is commercially available in various forms including, but not limited to, bulk fiber, foam, blanket, board, felt and paper form. Refractory insulation is commercially available in blanket form as Fiberfrax Durablanket® insulation blanket from Unifrax I LLC, Niagara Falls, N.Y., USA and RSI4-Blank and RSI8-Blank from Refractory Specialties Incorporated, Sebring, Ohio, USA. Refractory insulation is commercially available in board form as Duraboard® from Unifrax I LLC, Niagara Falls, N.Y., USA and CS85, Marinite and Transite boards from BNZ Materials Inc., Littleton, Colo., USA. Refractory insulation in felt form is commercially available as Fibrax Felts and Fibrax Papers from Unifrax I LLC, Niagara Falls. The refractory insulating material can be any thickness that provides the desired insulating properties, as set forth above. There is no upper limit on the thickness of the refractory insulating material; this is usually dictated by economics. However, refractory insulating material useful in the present invention can range from 1/32 inch to approximately 2 inches. Similarly, ceramic fiber materials including, but not limited to, silica, silicon carbide, alumina, aluminum silicate, aluminum oxide, zirconia, calcium silicate; glass fibers, mineral wool fibers, Wollastonite and fireclay, can be suspended in a polymer, such as polyurethane, latex, cement or epoxy, and used as a coating or a polymeric foam to create a refractory insulating material layer. Such a refractory insulating material layer can be used as the layer of insulating material 70 to block excessive ambient heat loads and retain the heat of hydration of concrete within the insulated flying table concrete form 10 of the present invention. Ceramic fibers suspended in a polymer binder, such as latex, are commercially available as Super Therm®, Epoxotherm and HPC Coating from Superior Products, II, Inc., Weston, Fla., USA.

The layer of insulating material 70 is preferably a multi-layer material with a first layer of refractory insulating material and a second layer of polymeric foam insulating material. The layer of insulating material 70 more preferably comprises a layer of ceramic fibers suspended in polymeric foam and a layer of expanded polystyrene foam. The layer of insulating material 70 optionally can include a layer of radiant heat reflecting material, such as a layer of polymeric foam with a heat reflective metal foil laminated to one primary surface thereof.

The layer of insulating material 70 is preferably a concrete insulating blanket having the insulating properties described above. Concrete insulating blankets, are commercially available under the designation concrete insulating blankets from Pregis Corp., Lake Forest, Ill. and concrete curing blankets from Granite City Tool, Waite Park, Minn. Alternatively, the layer of insulating material 70 is an electrically heated insulating blanket. Such electrically heated insulating blankets have been used in highway construction in the northern United States to prevent plastic concrete from freezing in winter weather. Suitable electrically heated insulating blankets are commercially available under the designation Powerblanket from Power Blanket LLC, Salt Lake City, Utah.

The insulated flying table form 10 and layer of insulating material 70 are left in place for a time sufficient for the plastic concrete 68 within the form to at least partially cure. While the insulated flying table form 10 and the layer of insulating material 70 are in place, the layer of insulating material 50 below the plastic concrete 68 and the layer of insulating material 70 above the curing concrete retain at least a portion, preferably a major portion, of the heat of hydration from the curing concrete within the insulated flying table form. By retaining at least a portion of the heat of hydration, the plastic concrete 68 formed on the insulated flying table form 10 cures more quickly and achieve better physical properties than it would have had it been cured using a conventional flying table form; i.e., a non-insulated flying table form. This is true for conventional portland cement concrete, but even more so for concrete including significant amounts of supplementary cementitious material, such as slag cement and/or fly ash, or other pozzolans, as described below. Furthermore, it is desirable to leave the insulated flying table form 10 and the layer of insulating material 70 in place with the curing concrete therein for a period of approximately 3 hours to approximately 7 days, preferably approximately 3 hours to approximately 3 days, preferably approximately 6 hours to approximately 3 days, more preferably approximately 12 hours to approximately 3 days, especially approximately 12 hours to approximately 2 days. After the concrete 68 has cured to a desired degree or amount, the insulated flying table form 10 can be moved downwardly from the concrete in a conventional manner known in the art by means of the leg/strut structure. The layer of insulating material 70 is also removed. The insulated flying table form 10 can then be moved so that a portion of the flying table extends outwardly from the edge of the building or structure (not shown). Suitable cables from a crane (not shown) are attached to the insulated flying table form 10 and the remainder of the insulated flying table form is mover out from under the concrete 68. The insulated flying table form 10 is then lifted by the crane (not shown) and placed on top of the concrete 68. The process is then repeated until the desired number of floors of a multi-story building or structure are constructed.

The insulated flying table form 10 of the present invention is advantageous over the prior art because it can be used in the same manner as a prior art flying table form. Therefore, there is no new training required to install, move (i.e., raise) or remove the insulated flying table forms of the present invention. However, the insulated flying table form 10 produces cured concrete more quickly and concrete having improved physical properties without using increased amounts of portland cement, without adding expensive chemical additives and without adding energy to the curing concrete. The insulated flying table form 10 also provides the option of reducing the amount of portland cement in the concrete mix, and, therefore, reducing the cost thereof while improving concrete performance. Furthermore, the insulated flying table form 10 allows the pouring of concrete in weather that otherwise would be too cold.

Figure 5:
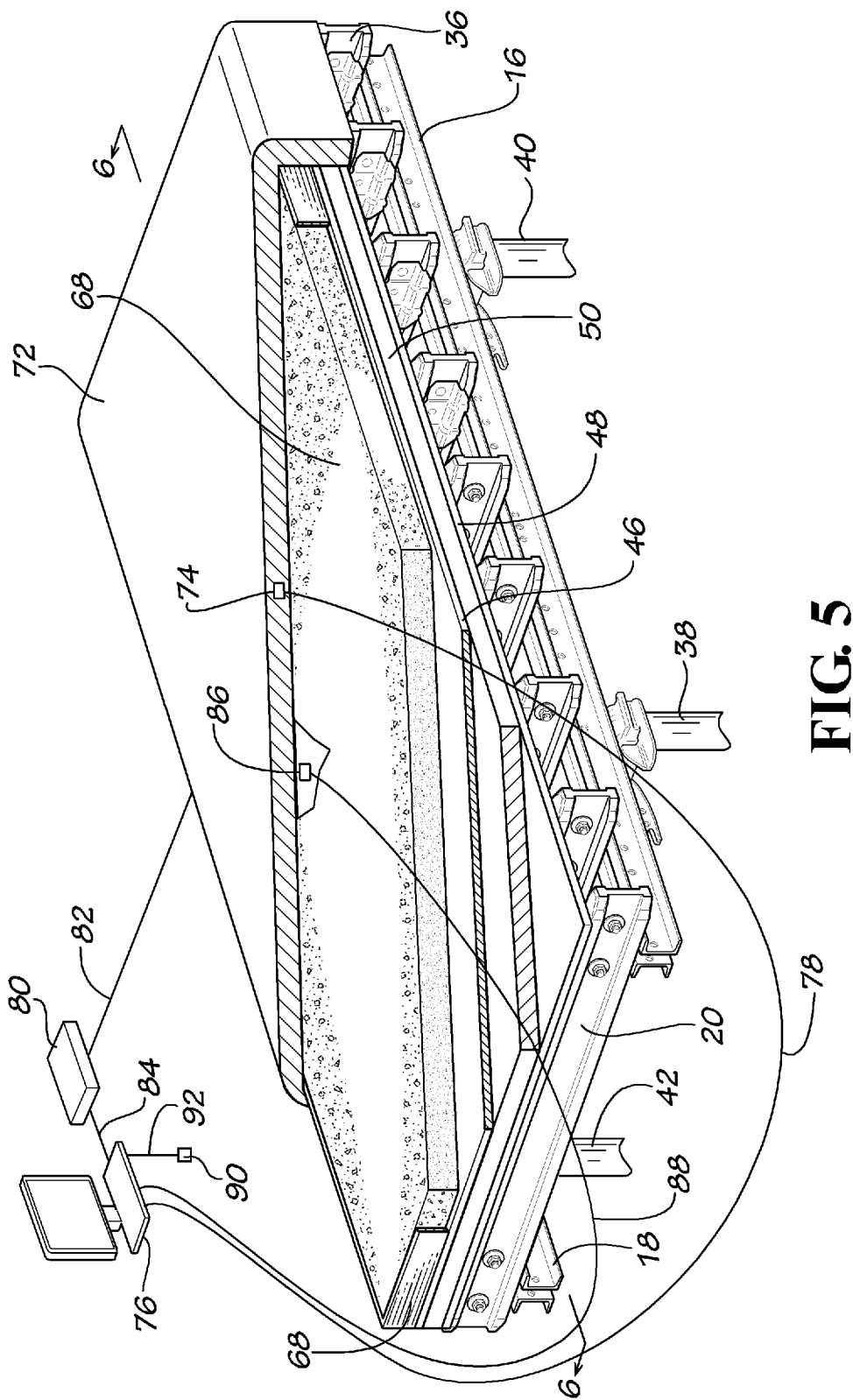
FIG. 5 is a partially broken away perspective view of an alternate disclosed embodiment of an insulated concrete deck form used with a flying table form in accordance with the present invention showing the use of a computing device to control the temperature of an electrically heated blanket over the top of the concrete layer.
Figure 6:
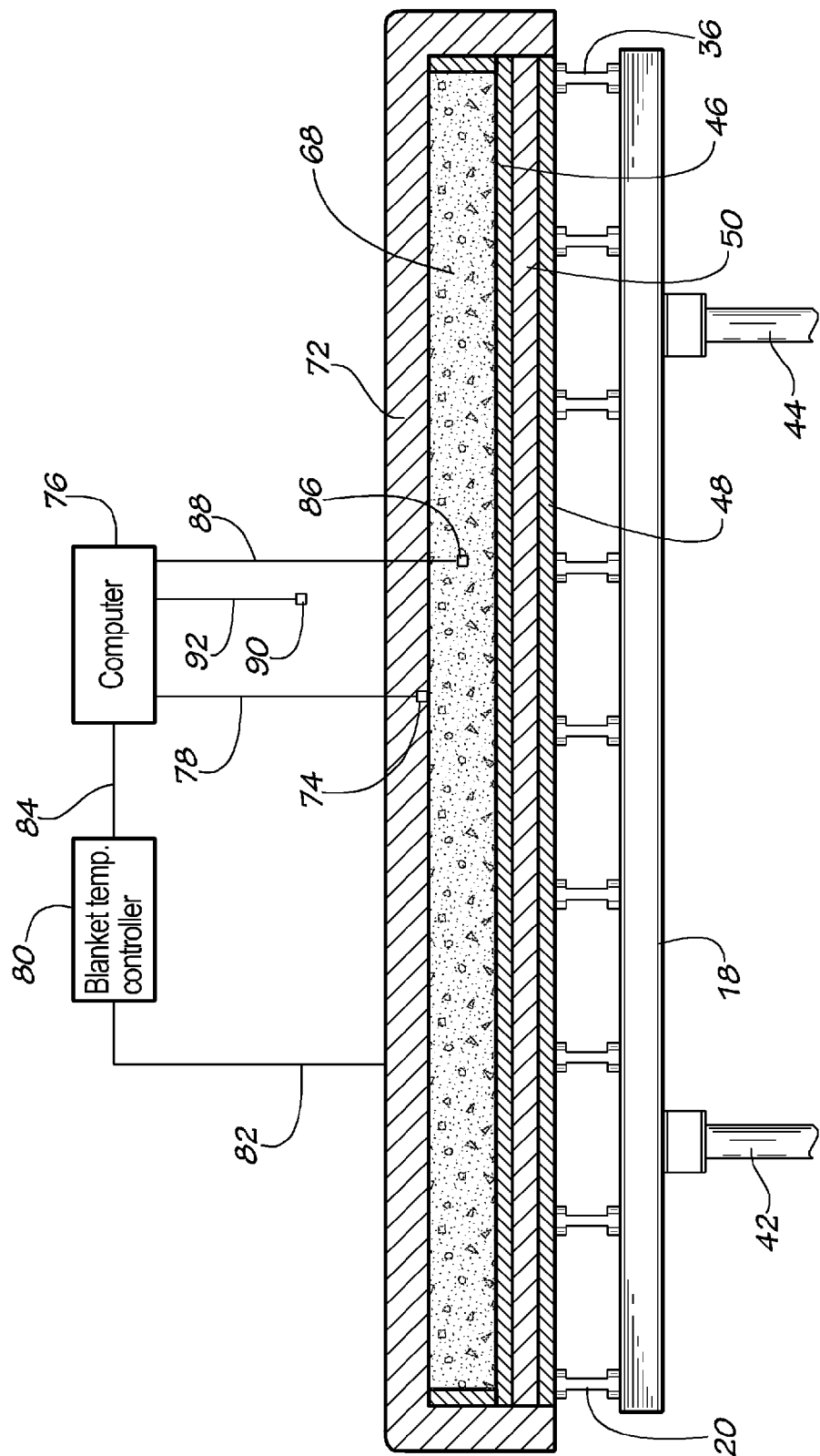
FIG. 6 is a cross-sectional view taken along the line 6-6 of the insulated concrete flying deck form shown in FIG. 5.

As stated above, in some applications, it may be desirable to use an electrically heated blanket for the layer of insulating material 70. FIGS. 5 and 6 show a disclosed embodiment of the insulating flying table form 10 using an electrically heated blanket 72 instead of the layer of insulating material 70. In this embodiment, by having the concrete 68 insulated on the bottom and heat provided on the top by the electrically heated blanket 72, the concrete cures much faster and achieve better properties. Infrared or far infrared heating blankets also can be used due to their relatively low voltage and relatively low power consumption characteristics. The lower voltages are preferred as they reduce or eliminate the chances of electrocution by a worker.

Optionally, in another disclosed embodiment, a temperature sensor 74 is included in the electrically heated blanket 72 adjacent the concrete 68. The temperature sensor 74 is connected to a computing device 76 by an electric circuit, such as by the wires 78. The electrically heated blanket 72 is connected to a blanket temperature controller 80 by an electric circuit, such as by the wires 82. The blanket temperature controller 80 is connected to the computing device 76 by an electric circuit, such as by the wires 84. The blanket temperature controller 80 can adjust the amount of electricity provided to the electrically heated blanket 72 or vary the amount of time that the electrically heated blanket is energized in order to adjustably control the amount of heat produced by the electrically heated blanket and thereby adjust the temperature of the electrically heated blanket. Optionally, a second temperature sensor 86 is disposed within the curing plastic concrete 68, such as approximately in the middle thereof. The second temperature sensor 86 is connected to the computing device 76 by an electric circuit, such as by the wires 88. Optionally, a third temperature sensor 90 is positioned adjacent the insulated flying table form 10. The third temperature sensor 90 is connected to the computing device 76 by an electric circuit, such as by the wires 92. The first and second temperature sensors 74, 86 allow the computing device 76 to continuously, or periodically, measure and store the temperature of the curing plastic concrete 68. The third temperature sensor 90 allows the computing device 76 to continuously, or periodically, measure and store the temperature of the air adjacent the insulated flying table form 10; i.e., ambient temperature. The electrically heated blanket 72 can be operated in several different modes that are described below.

Figure 7:
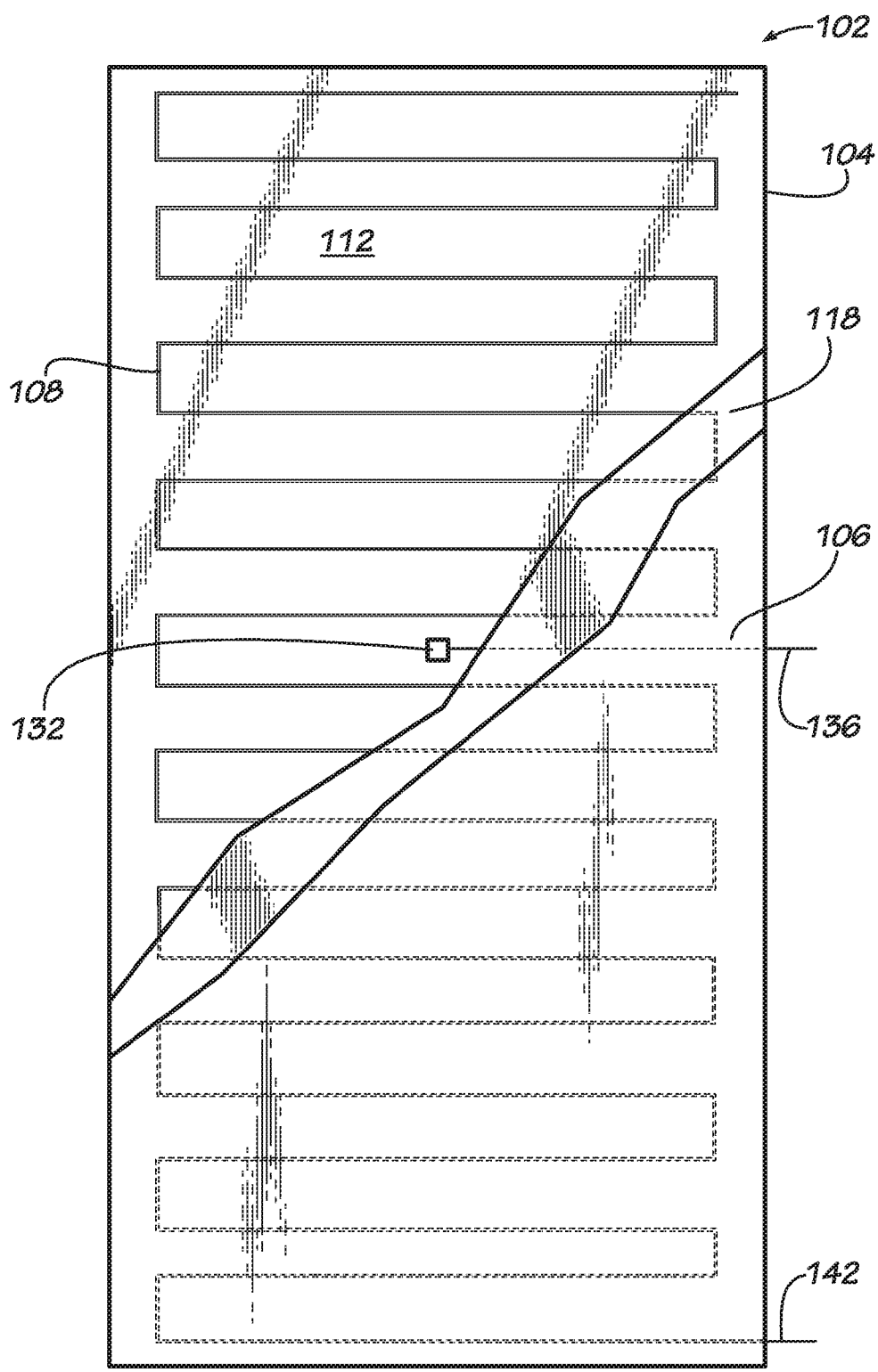
FIG. 7 is a plan view of a disclosed embodiment of an electrically heated deck form for use with a flying table form in accordance with the present invention.
Figure 8:
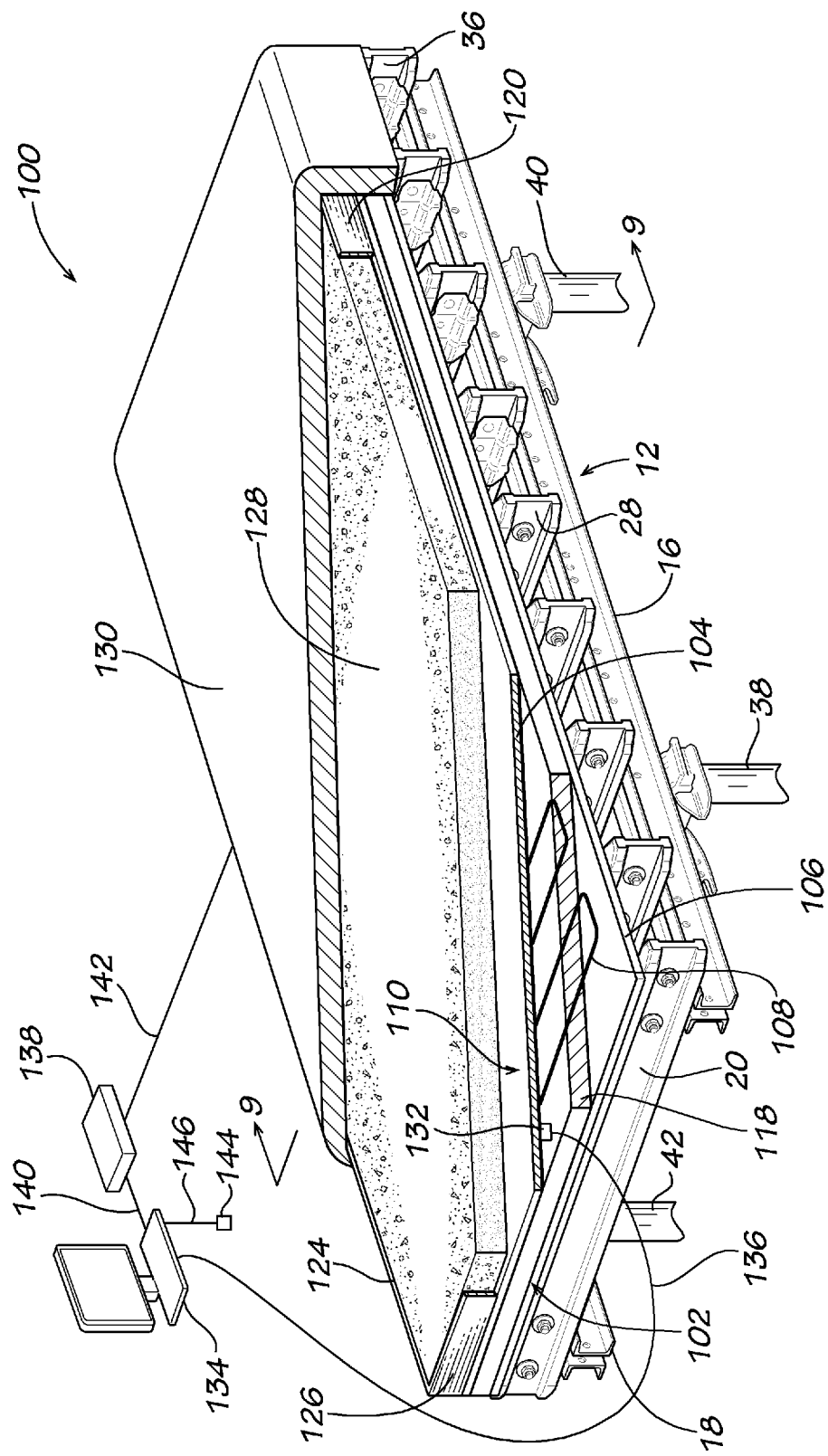
FIG. 8 is a partially broken away perspective schematic view of an alternate disclosed embodiment of an electrically heated concrete deck form for use with a flying table form in accordance with the present invention showing the use of a computing device to control the temperature of the electrically heated concrete deck form shown with an insulating layer over the top of the concrete layer.
Figure 9:
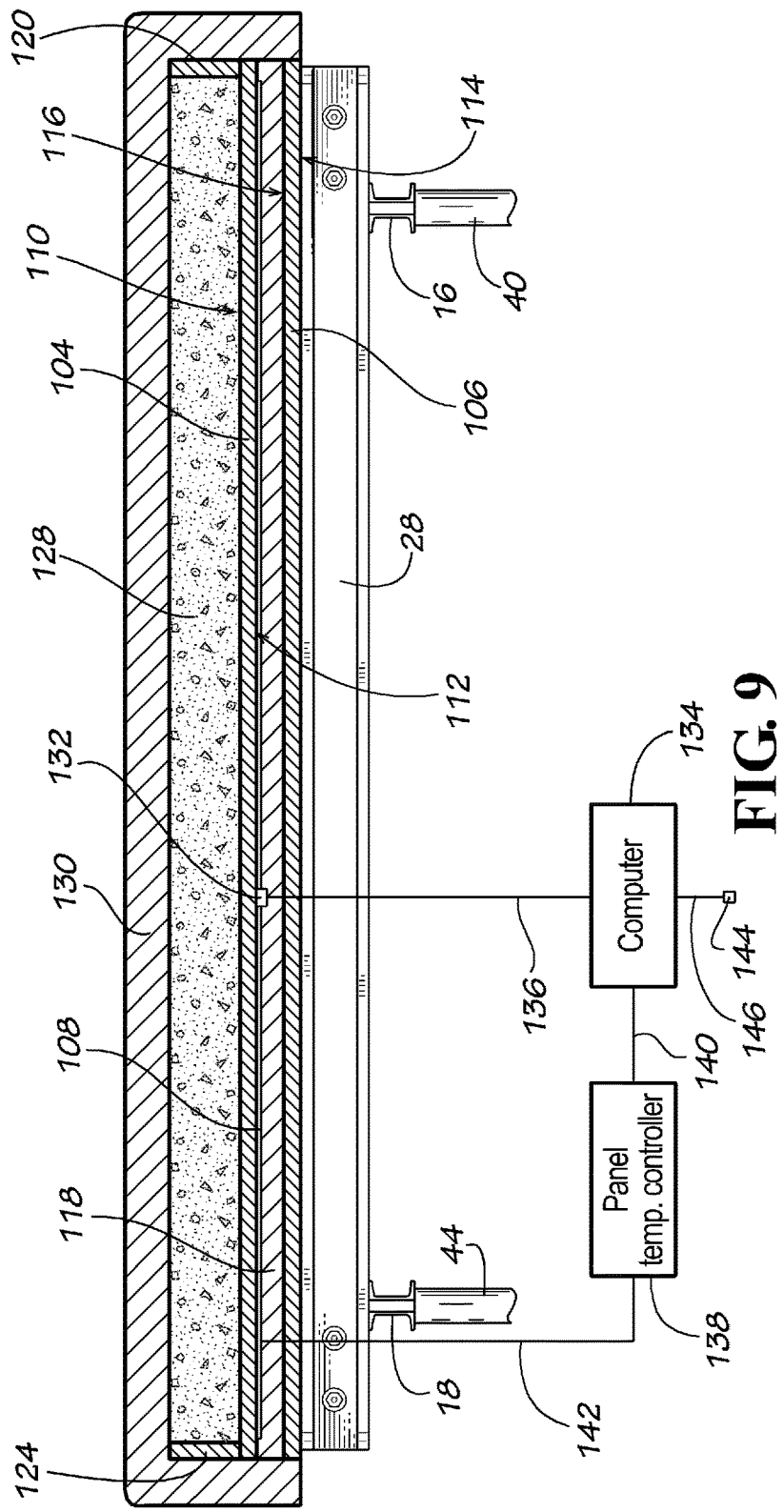
FIG. 9 is a cross-sectional schematic view taken along the line 9-9 of the electrically heated deck form shown in FIG. 8.

In another disclosed embodiment, it may be desirable to use an electrically heated deck form with the flying table form. A disclosed embodiment of the electrically heated flying table form in accordance with the present invention is shown in FIGS. 7-9.

The electrically heated flying table form 100 (FIG. 8) comprises an electrically heated deck 102 (FIG. 7), a deck support structure 12 and shore posts 38-44 of the same construction as the insulated flying table form 10. Therefore, the deck support structure 12 and the shore posts 38-44 will not be discussed further here.

The electrically heated deck 102 comprises a rectangular concrete forming face or first panel 104, a second panel 106 and an electric resistance heating ribbon, tape or wire 108 disposed between the first and second panels. The first panel 104 includes a first primary surface 110 and an opposite second primary surface 112; the second panel 106 includes first primary surface 114 and an opposite second primary surface 116. The electrically heated deck 102 also optionally includes a layer of insulating material 118 disposed between the first and second panels 104, 106 and such that the electric resistance heating wire 108 is disposed between the second primary surface 112 of the first panel 104 and the layer of insulating material 118. Electric resistance heating ribbons, tapes or wires are known and are the same type as used in conventional electric blankets and other electric heating devices. The electric resistance heating wire 108 is electrically insulated so that it will not make electrical contact with the first panel 104. However, the electric resistance heating wire 108 is in thermal contact with the second primary surface 112 of the first panel 104 so that when an electric current is passed through the electric resistance heating wire it heats the first panel. The electric resistance heating wire 108 is placed in a serpentine path on the second primary surface 112 of the first panel 104 so that the first panel is heated uniformly. The electric resistance heating wire 108 is of a type and the amount of wire in contact with the second primary surface 112 of the first panel 104 is selected so that the electric resistance heating wire heats the first panel to a temperature at least as high as the desired temperature of the concrete that is placed in contact with the first primary surface 110 of the first panel. The electrically heated flying table form 100 can also be used to accelerate the curing of concrete, as described below. Therefore, it is desirable that the first panel 104 be able to be heated to temperatures sufficient to accelerate the curing of the concrete, such as at least as high as 50 to 70 ° C.

As stated above, disposed between the first and second panels 104, 106 is a layer of insulating material 118. The layer of insulating material 118 is preferably a closed cell polymeric foam, such as expanded polystyrene, polyisocyanurate, polyurethane, and the like. The layer of insulating material 118 has insulating properties equivalent to at least 0.5 inches of expanded polystyrene foam; preferably equivalent to at least 1 inch of expanded polystyrene foam, preferably equivalent to at least 2 inches of expanded polystyrene foam, more preferably equivalent to at least 3 inches of expanded polystyrene foam, most preferably equivalent to at least 4 inches of expanded polystyrene foam. The layer of insulating material 118 can have insulating properties equivalent to approximately 0.5 inches to approximately 8 inches of expanded polystyrene foam. The layer of insulating material 118 can have insulating properties equivalent to approximately 0.5 inches, approximately 1 inch, approximately 2 inches, approximately 3 inches or approximately 4 inches of expanded polystyrene foam. The layer of insulating material 118 can have an R-value of greater than 2.5, preferably greater than 5, preferably greater than 10, more preferably greater than 15, especially greater than 20. The layer of insulating material 118 preferably has an R-value of approximately 5 to approximately 40; more preferably between approximately 10 to approximately 40; especially approximately 15 to approximately 40; more especially approximately 20 to approximately 40. The layer of insulating material 118 preferably has an R-value of approximately 5, more preferably approximately 10, especially approximately 15, most preferably approximately 20.

The electric resistance heating wire 108 is disposed between the layer of insulating material 118 and the second primary surface 112 of the first panel 104. Optionally, the surface of the layer of insulating material 118 adjacent the second primary surface 112 of the first panel 104 includes a layer of radiant heat reflective material (not shown), such as metal foil, especially aluminum foil. The layer of radiant heat reflective material helps direct the heat from the electric resistance heating wire 108 toward the first panel 104. The layer of insulating material 118 can be preformed and affixed in place on the second primary surface 112 of the first panel 104, or the layer of insulating material can be formed in situ, such as by spraying a foamed or self-foaming polymeric material onto the second primary surface of the first panel. Another preferred material for the layer of insulating material 118 is metalized plastic bubble pack type insulating material or metalized closed cell polymeric foam. Such material is commercially available as Space Age® reflective insulation from Insulation Solutions, Inc., East Peoria, Ill. 61611. The Space Age® product is available as two layers of polyethylene air bubble pack sandwiched between one layer of white polyethylene and one layer of reflective foil; two layers air bubble pack sandwiched between two layers of reflective foil; or a layer of closed cell polymeric foam (such as high density polyethylene foam) disposed between one layer of polyethylene film and one layer of reflective foil. All three of these Space Age® product configurations are useful in the present invention for the radiant heat reflective material.

The layer of insulating material 118 can also be made from a refractory insulating material, such as a refractory blanket, a refractory board or a refractory felt or paper. Refractory insulation is typically used to line high temperature furnaces or to insulate high temperature pipes. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. Refractory insulating material is commercially available in various forms including, but not limited to, bulk fiber, foam, blanket, board, felt and paper form. Refractory insulation is commercially available in blanket form as Fiberfrax Durablanket® insulation blanket from Unifrax I LLC, Niagara Falls, N.Y., USA and RSI4-Blank and RSI8-Blank from Refractory Specialties Incorporated, Sebring, Ohio, USA. Refractory insulation is commercially available in board form as Duraboard® from Unifrax I LLC, Niagara Falls, N.Y., USA and CS85, Marinite and Transite boards from BNZ Materials Inc., Littleton, Colo., USA. Refractory insulation in felt form is commercially available as Fibrax Felts and Fibrax Papers from Unifrax I LLC, Niagara Falls. The refractory insulating material can be any thickness that provides the desired insulating properties, as set forth above. There is no upper limit to the thickness of the refractory insulating material; this is usually dictated by economics and weight. However, refractory insulating material useful in the present invention can range from $1/32$ inch to approximately 2 inches. Similarly, ceramic fiber materials including, but not limited to, silica, silicon carbide, alumina, aluminum silicate, aluminum oxide, zirconia, calcium silicate; glass fibers, mineral wool fibers, Wollastonite and fireclay, can be suspended in a polymer, such as polyurethane, latex, cement or epoxy, and used as a coating or a polymeric foam to create a refractory insulating material layer, for example covering, or substantially covering, one of the primary surfaces 112, 116 of the first or second panels 104, 106, respectively, or both. Such a refractory insulating material layer can be used as the layer of insulating material 118 to block excessive ambient heat loads and retain the heat of hydration of concrete within the electrically heated flying table form 100 of the present invention. Ceramic fibers suspended in a polymer binder, such as latex, are commercially available as Super Therm®, Epoxotherm and HPC Coating from Superior Products, II, Inc., Weston, Fla., USA.

The layer of insulating material 118 is preferably a multi-layer material with a first layer of refractory insulating material and a second layer of closed cell polymeric foam insulating material. The layer of insulating material 118 more preferably comprises a layer of ceramic fibers suspended in a polymer, especially a polymeric foam including, but not limited to, polystyrene foam, polyurethane foam, polyisocyanurate foam, latex foam or any other suitable type of polymeric foam.

The first panel 104 is preferably made from a heat conducting material, such as metal, especially steel or aluminum. The second panel 106 is preferably made from a conductive heat insulating material or a poor heat conducting material including, but not limited to, wood, plywood, high density overlay (HDO) plywood, wood composite materials, wood or composite materials with polymer coatings, plastic, and plastic composites. The second panel 106 is preferably made from a sheet of high density overlay (HDO) plywood. The second panel 106 can be any useful thickness depending on the anticipated loads to which the form will be subjected. However, plywood thicknesses of $1/8$ inch to $7/8$ inches can be used. The first panel 104, the layer of insulating material 118 and the second panel 106 are preferably laminated into a single unit either adhesively or mechanically.

Use of the electrically heated flying table form 100 will now be considered in another disclosed embodiment. A particular advantage of the present invention is that the electrically heated flying table form 100 can be used in the same manner as a conventional prior art flying table form. The electrically heated flying table form 100 can also be used in the same manner as the insulated flying table form 10, as described above. The electrically heated flying table form 100 is erected at a desired location. Of course, multiple electrically heated flying table forms 100 can be ganged together to form a deck form of a desired size and shape. For example, a plurality of electrically heated deck forms 102 are attached end-to-end to form a deck form 21 feet wide and 100 feet long. In such a form, the top chord beams 16, 18 are also 100 feet long and sufficient transverse beams, such as the beams 20-36, are added on top of the top chord beams to form a supporting structure for the multiple deck forms 102.

After the electrically heated flying table form 100 is erected in a desired location, side form members 120, 122, 124, 126 are positioned as desired on the first primary surface 110 of the first panel 104. Plastic concrete 128 is then placed on the first primary surface 110 of the first panel 104 so that the plastic concrete fills the form to a desired depth or thickness, such as up to the top of the side form members 120-126. The surface of the plastic concrete 128 is finished in any desired manner. Then, as soon as practical, a layer of insulating material 130 is placed over the curing plastic concrete 128 and preferably overhanging the side form members 120-126. The layer of insulating material 130 is made from any suitable material providing conductive heat insulating properties, preferably a sheet of closed cell polymeric foam. The layer of insulating material 130 is preferably made from closed cell foams of polyvinyl chloride, urethane, polyurethane, polyisocyanurate, phenol, polyethylene, polyimide or polystyrene. Such foam preferably has a density of 1 to 3 pounds per cubic foot, or more. The layer of insulating material 130 preferably has insulating properties equivalent to at least 0.25 inches of expanded polystyrene foam, preferably equivalent to at least 0.5 inches of expanded polystyrene foam, preferably equivalent to at least 1 inch of expanded polystyrene foam, more preferably equivalent to at least 2 inches of expanded polystyrene foam, more preferably equivalent to at least 3 inches of expanded polystyrene foam, most preferably equivalent to at least 4 inches of expanded polystyrene foam, especially equivalent to at least 8 inches of expanded polystyrene foam. There is no maximum thickness for the layer of insulting material 130 equivalent to expanded polystyrene foam useful in the present invention. The maximum thickness is usually dictated by economics, weight, ease of handling and building or structure design. However, for most applications a maximum insulating equivalence of 8 inches of expanded polystyrene foam can be used. In another embodiment of the present invention, the layer of insulating material 130 has insulating properties equivalent to approximately 0.25 to approximately 8 inches of expanded polystyrene foam, preferably approximately 0.5 to approximately 8 inches of expanded polystyrene foam, preferably approximately 1 to approximately 8 inches of expanded polystyrene foam, preferably approximately 2 to approximately 8 inches of expanded polystyrene foam, more preferably approximately 3 to approximately 8 inches of expanded polystyrene foam, most preferably approximately 4 to approximately 8 inches of expanded polystyrene foam. These ranges for the equivalent insulating properties for the layer of insulating material 130 include all of the intermediate values. Thus, the layer of insulating material 130 used in another disclosed embodiment of the present invention has insulating properties equivalent to approximately 0.25 inches of expanded polystyrene foam, approximately 0.5 inches of expanded polystyrene foam, approximately 1 inch of expanded polystyrene foam, approximately 2 inches of expanded polystyrene foam, approximately 3 inches of expanded polystyrene foam, approximately 4 inches of expanded polystyrene foam, approximately 5 inches of expanded polystyrene foam, approximately 6 inches of expanded polystyrene foam, approximately 7 inches of expanded polystyrene foam, or approximately 8 inches of expanded polystyrene foam. Expanded polystyrene foam has an R-value of approximately 4 to 6 per inch thickness. Therefore, the layer of insulating material 130 should have an R-value of greater than 1.5, preferably greater than 4, more preferably greater than 8, most preferably greater than 12, especially greater than 20, more especially greater than 30, most especially greater than 40. The layer of insulating material 130 preferably has an R-value of approximately 1.5 to approximately 40; more preferably between approximately 4 to approximately 40; especially approximately 8 to approximately 40; more especially approximately 12 to approximately 40. The layer of insulating material 130 preferably has an R-value of approximately 1.5, more preferably approximately 4, most preferably approximately 8, especially approximately 20, more especially approximately 30, most especially approximately 40.

The layer of insulating material 130 can also be made from a refractory insulating material, such as a refractory blanket, a refractory board or a refractory felt or paper. Refractory insulation is typically used to line high temperature furnaces or to insulate high temperature pipes. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. Refractory insulating material is commercially available in various form including, but not limited to, bulk fiber, foam, blanket, board, felt and paper form. Refractory insulation is commercially available in blanket form as Fiberfrax Durablanket® insulation blanket from Unifrax I LLC, Niagara Falls, N.Y., USA and RSI4-Blank and RSI8-Blank from Refractory Specialties Incorporated, Sebring, Ohio, USA. Refractory insulation is commercially available in board form as Duraboard® from Unifrax I LLC, Niagara Falls, N.Y., USA and CS85, Marinite and Transite boards from BNZ Materials Inc., Littleton, Colo., USA. Refractory insulation in felt form is commercially available as Fibrax Felts and Fibrax Papers from Unifrax I LLC, Niagara Falls. The refractory insulating material can be any thickness that provides the desired insulating properties, as set forth above. There is no upper limit on the thickness of the refractory insulating material; this is usually dictated by economics. However, refractory insulating material useful in the present invention can range from 1/32 inch to approximately 2 inches. Similarly, ceramic fiber materials including, but not limited to, silica, silicon carbide, alumina, aluminum silicate, aluminum oxide, zirconia, calcium silicate; glass fibers, mineral wool fibers, Wollastonite and fireclay, can be suspended in a polymer, such as polyurethane, latex, cement or epoxy, and used as a coating or a polymeric foam to create a refractory insulating material layer. Such a refractory insulating material layer can be used as the layer of insulating material 130 to block excessive ambient heat loads and retain the heat of hydration of concrete within the electrically heated flying table form 10 of the present invention. Ceramic fibers suspended in a polymer binder, such as latex, are commercially available as Super Therm®, Epoxotherm and HPC Coating from Superior Products, II, Inc., Weston, Fla., USA.

The layer of insulating material 130 is preferably a multi-layer material with a first layer of refractory insulating material and a second layer of polymeric foam insulating material. The layer of insulating material 130 more preferably comprises a layer of ceramic fibers suspended in polymeric foam and a layer of expanded polystyrene foam. The layer of insulating material 130 optionally can include a layer of radiant heat reflecting material, such as a layer of polymeric foam with a heat reflective metal foil laminated to one primary surface thereof.

The layer of insulating material 130 is preferably a concrete insulating blanket having the insulating properties described above. Concrete insulating blankets, are commercially available under the designation concrete insulating blankets from Pregis Corp., Lake Forest, Ill. and concrete curing blankets from Granite City Tool, Waite Park, Minn. Alternatively, the layer of insulating material is an electrically heated blanket. Such electrically heated insulating blankets have been used in highway construction in the northern United States to prevent plastic concrete from freezing in winter weather. Suitable electrically heated insulating blankets are commercially available under the designation Powerblanket from Power Blanket LLC, Salt Lake City, Utah.

The electrically heated flying table form 100 and layer of insulating material 130 are left in place for a time sufficient for the plastic concrete 128 within the form to at least partially cure. While the electrically heated flying table form 100 and the layer of insulating material 130 are in place, the electrical resistance heated wire 108 heats the curing concrete 128 in a desired manner, as described below, and the layer of insulating material 130 retains at least a portion, preferably a major portion, of the heat of hydration from the curing concrete within the electrically heated flying table form. By heating the concrete 128 in a desired manner, the plastic concrete within the electrically heated flying table form 100 cures more quickly and achieve better physical properties than it would have had it been cured in a conventional flying table form; i.e., a non-heated, non-insulated flying table form. This is true for conventional portland cement concrete, but even more so for concrete including significant amounts of supplementary cementitious material, such as slag cement and/or fly ash, or other pozzolans, as described below. Furthermore, it is desirable to leave the electrically heated flying table form 100 and the layer of insulating material 130 in place with the curing concrete therein for a period of approximately 3 hours to approximately 7 days, preferably approximately 3 hours to approximately 3 days, preferably approximately 6 hours to approximately 3 days, more preferably approximately 12 hours to approximately 3 days, especially approximately 12 hours to approximately 2 days, more especially approximately 12 hours to approximately 24 hours, most especially approximately 1 hour to 24 hours. After the concrete 128 has cured a desired amount or degree, the side form members 120-126 are removed, the electrically heated flying table form 100 is moved downwardly from the concrete in a conventional manner known in the art by means of the shore posts 38-44 and the layer of insulating material 130 is removed. The electrically heated flying table form 100 can then be moved so that a portion of the flying table form extends outwardly from the edge of the building or structure (not shown). Suitable cables from a crane (not shown) are attached to the electrically heated flying table form 100 and the remainder of the electrically heated flying table form is mover out from under the concrete 128. The electrically heated flying table form 100 is then lifted by the crane (not shown) and placed on top of the concrete 128. The process is then repeated until the desired number of floors of a multi-story building or structure are constructed.

The electrically heated flying table form 100 of the present invention is advantageous over the prior art because it can be used in the same manner as a prior art flying table form. Therefore, there is no new training required to install, move (i.e., raise) or remove these forms. However, the electrically heated flying table form 100 produces cured concrete more quickly and concrete having improved physical properties without using increased amounts of portland cement and without adding expensive chemical additives to the curing concrete. The electrically heated flying table form 100 also provides the option of reducing the amount of portland cement in the concrete mix, and, therefore, reducing the cost thereof while improving concrete performance. Furthermore, the electrically heated flying table form 100 allows the pouring of concrete in weather that otherwise would be too cold.

When greater control of the temperature of the electrically heated flying table form 100 is desired, a first temperature sensor 132 in thermal contact with the second primary surface 112 of the first panel 104 of the electrically heated flying table form is preferably used (FIGS. 8 and 9). The first temperature sensor 132 is connected to a computing device 134 by an electric circuit, such as by the wires 136. The temperature sensor 132 allows the computing device 134 to continuously, or periodically, read and store the temperature of the first panel 104 on the electrically heated flying table form 100. The computing device 134 is connected to a panel temperature controller 138 by an electric circuit, such as by the wires 140. The panel temperature controller 138 is connected to a source of electricity, such as 12, 24, 48, 120 or 220 volts AC or 12 or 24 volts DC electric current, by wires (not shown). The lower voltages are desirable as they eliminate the chances of electrocution by a worker touching the metal frame in a wet environment. The panel temperature controller 138 is also connected to the electric resistance heating wire 108 of the electrically heated deck 102 of the electrically heated flying table form 100 by an electric circuit, such as by the wires 142. The computing device 134 and the panel temperature controller 138 are configured and programmed such that the computing device controls the amount of heat produced by the electric resistance heating wire 108 in the electrically heated deck form 102. Thus, the computing device 134 controls the amount of heat that is provided to plastic concrete 128 on the electrically heated deck form 102 of the electrically heated flying table form 100. A second temperature sensor 144 is optionally placed adjacent the electrically heated flying table form 100. The second temperature sensor 144 is connected to the computing device 134 by an electric circuit, such as by the wires 146. The second temperature sensor 144 allows the computing device to continually, or periodically, measures and store the temperature of the air surrounding the electrically heated flying table form 100; the ambient temperature.

Operation of the insulated flying table concrete form 10 and the electrically heated flying table form 100 in various modes will now be considered. In its simplest mode, the insulated flying table concrete form 10 and the electrically heated flying table form 100 are operated in an on/off mode. In this mode, a constant amount of electricity is provided to the electric resistance heating wire (not shown) of the electrically heated blanket 72 of the insulated flying table form 10 (FIGS. 1-6) or to the electric resistance heating wire 108 of the electrically heated deck 102 (FIGS. 7-9) so that a constant amount of heat is provided to the concrete 68 of the insulated flying table form 10 or to the concrete 128 on the first panel 104 of the electrically heated deck 102 of the electrically heated flying table form 100. Thus, an operator can turn the heat on and turn the heat off. For this mode of operation, no computing device and no temperature sensors are required; a simple controller 80, 138 with an on/off switch (not shown) is sufficient.

In the next mode of operation, various fixed amounts of electricity are provided to the electric resistance heating wire (not shown) of the electrically heated blanket 72 of the insulated flying table form 10 (FIGS. 1-6) or to the electric resistance heating wire 108 of the electrically heated deck 102 of the electrically heated flying table form 100 (FIGS. 7-9), such as a low amount, a medium amount and a high amount. This can be done by providing a different voltage to the electric resistance heating wire (not shown) of the electrically heated blanket 72 of the insulated flying table form 10 or to the electric resistance heating wire 108 of the electrically heated deck 102 of the electrically heated flying table form 100 or by changing the amount of time that the electric resistance heating wire of the electrically heated blanket 72 of the insulated flying table form 10 or to the electric resistance heating wire 108 of the electrically heated deck 102 of the electrically heated flying table form 100 is energized. Thus, an operator can select one of several predetermined amounts of heat provided to the concrete 68 in the insulated flying table form 10 or to the concrete 128 on the panel 104 of the electrically heated deck 102 of the electrically heated flying table form 100. For this mode of operation, no computing device and no temperature sensors are required; a simple controller 80, 138 with a selector switch (not shown) will suffice.

The next mode of operation is for the electrically heated blanket 72 of the insulated flying table form 10 or the first panel 104 of the electrically heated deck 102 of the electrically heated flying table form 100 to be held at a constant desired temperature. For this more of operation, the computing devices 76, 134 are programmed to perform the process shown in FIG. 10.

Figure 10:
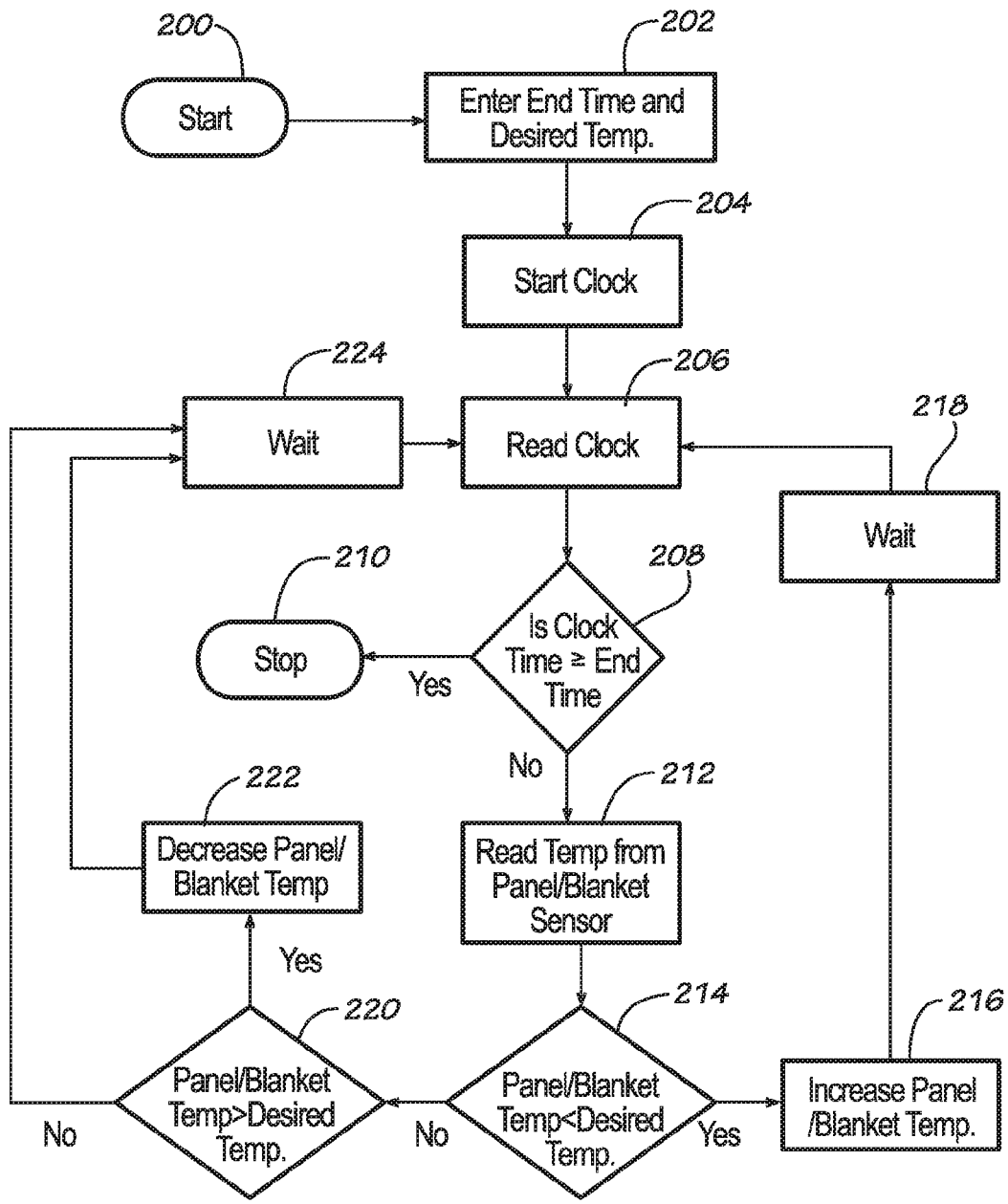
FIG. 10 is a flow diagram of a disclosed embodiment of a temperature controlled concrete curing process utilizing an electrically heated deck form used with a flying table form in accordance with the present invention.

As shown in FIG. 10, the process starts at the block 200 and proceeds to the block 202 where a desired end time and a desired temperature are entered. These values are stored in memory locations, such as in the RAM memory of the computing devices 76, 134. The end time is the desired amount of temperature controlled curing time for the concrete within the insulated flying table form 10 or the electrically heated flying table form 100. The desired temperature is the temperature at which the electrically heated blanket 72 of the insulated flying table form 10 or the first panel 104 of the electrically heated deck 102 of the electrically heated flying table form 100 will be maintained even though the ambient temperature may change. Any desired temperature can be selected. However, it is preferred that the desired temperature is about 50° C.; more preferably about 55° C.; most preferably about 60° C.; especially about 65° C.; more especially about 70° C.; most especially about 63° C. The process proceeds from the block 202 to the block 204 where the clock is initialized to time equal to zero and the clock is started. The clock measures the elapsed time from when the plastic concrete within the insulated flying table form 10 or the electrically heated flying table form 100 is subjected to the controlled temperature curing process.

The process proceeds from the block 204 to the block 206 where the clock is read. The time that is read from the clock is then stored in a memory location, such as in the RAM memory of the computing devices 76, 134. The process proceeds from the block 206 to the decision block 208. A desired end time for terminating the process, such as 1 hour to 7 days, is entered into a memory location in the computing devices 76, 134 at the block 202. At the block 208, the clock time stored in the memory location is compared to the end time stored in the memory location of the computing devices 76, 134. If the clock time is less than the end time, the process proceeds to the block 212. If the clock time is greater than or equal to the end time, the process proceeds to the block 210 where the process is terminated.

At the block 212, the temperature from the panel temperature sensor 74 (or optionally the temperature sensor 86) of the insulated flying table form 10 or the temperature sensor 132 of the electrically heated flying table form 100 is read and stored in memory locations, such as in the RAM memory of the computing devices 76, 134. The process then proceeds from the block 212 to the decision block 214. At the decision block 214, the temperature from the panel temperature sensors 74, 132 (or optionally the temperature sensor 86) is compared to the stored desired temperature. If the measured panel temperature is less than the stored desired temperature, the process proceeds to the block 216. When this condition is encountered, the electrically heated blanket 72 temperature or the first panel 104 temperature is less than the desired temperature, so it is necessary to provide additional heat to the electrically heated blanket or to the first panel. At the block 216 the temperature of the electrically heated blanket 72 or the temperature of the first panel 104 is increased. This can be done by the computing devices 76, 134 sending a signal to the panel/blanket temperature controller 80, 138 providing an increased electrical voltage to the electric resistance heating wire (not shown) of the electrically heated blanket 72 or the electric resistance heating wire 108 of the electrically heated deck 102 or by increasing the time that the electric resistance heating wire is energized for each of the electrically heated blanket of the insulated flying table form 10 or electrically heated deck 102 of the electrically heated flying table form 100. The process then proceeds from the block 216 to the block 218. At the block 218, a predetermined wait time is executed before the process proceeds from the block 218 to the block 206. The wait time can be any desired time that is suitable for the panel temperature being measured, such as one second or ten seconds or 30 seconds or one minute or one hour. If the actual measured blanket/panel temperature is greater than or equal to the desired temperature, the process proceeds from the decision block 214 to the decision block 220.

At the decision block 220, if the actual measured blanket/panel temperature is greater than the stored desired temperature, the process proceeds to the block 222. At the block 222, the temperature of the electrically heated blanket 72 or the first panel 104 of electrically heated deck 102 is decreased. This can be done by the computing devices 76, 134 sending a signal to the blanket/panel temperature controller 80, 138 to decrease the temperature of the electrically heated blanket 72 or the first panel 104 of electrically heated deck 102. This can be done by the temperature controller 76, 138 providing a reduced electrical voltage to the electric resistance heating wire (not shown) of the electrically heated blanket 72 or the electric resistance heating wire 108 of the electrically heated deck panel 102 or by reducing the time that the electric resistance heating wire is energized for each of the electrically heated blanket 72 or the first panel 104 of the electrically heated deck 102. The process then proceeds from the block 222 to the block 224. At the block 224, a predetermined wait time is executed before the process proceeds from the block 224 to the block 206. The wait time can be any desired time that is suitable for the temperature of the electrically heated blanket 72 or temperature of the first panel 104 of the electrically heated deck 102 being measured, such as one second or ten seconds or 30 seconds or one minute or one hour. If the actual measured blanket/panel temperature is not greater than the stored desired temperature, the process proceeds to the block 224. At the decision block 220, if the actual measured blanket/panel temperature is less than or equal to the stored desired temperature, the process proceeds to the block 222. At the block 222, the temperature of the electrically heated blanket 72 or the first panel 104 of the electrically heated deck 102 is decreased. This can be done by the computing devices 76, 134 sending a signal to the blanket/panel temperature controller 80, 138 providing a reduced electrical voltage to the electric resistance heating wire (not shown) of the electrically heated blanket 72 or the electric resistance heating wire 108 of the electrically heated deck 102 or by reducing the time that the electric resistance heating wire of the electrically heated blanket 72 or the electric resistance heating wire 108 of the first panel 104 of the electrically heated deck 102 is energized. The process then proceeds from the block 222 to the block 224.

Figure 11:
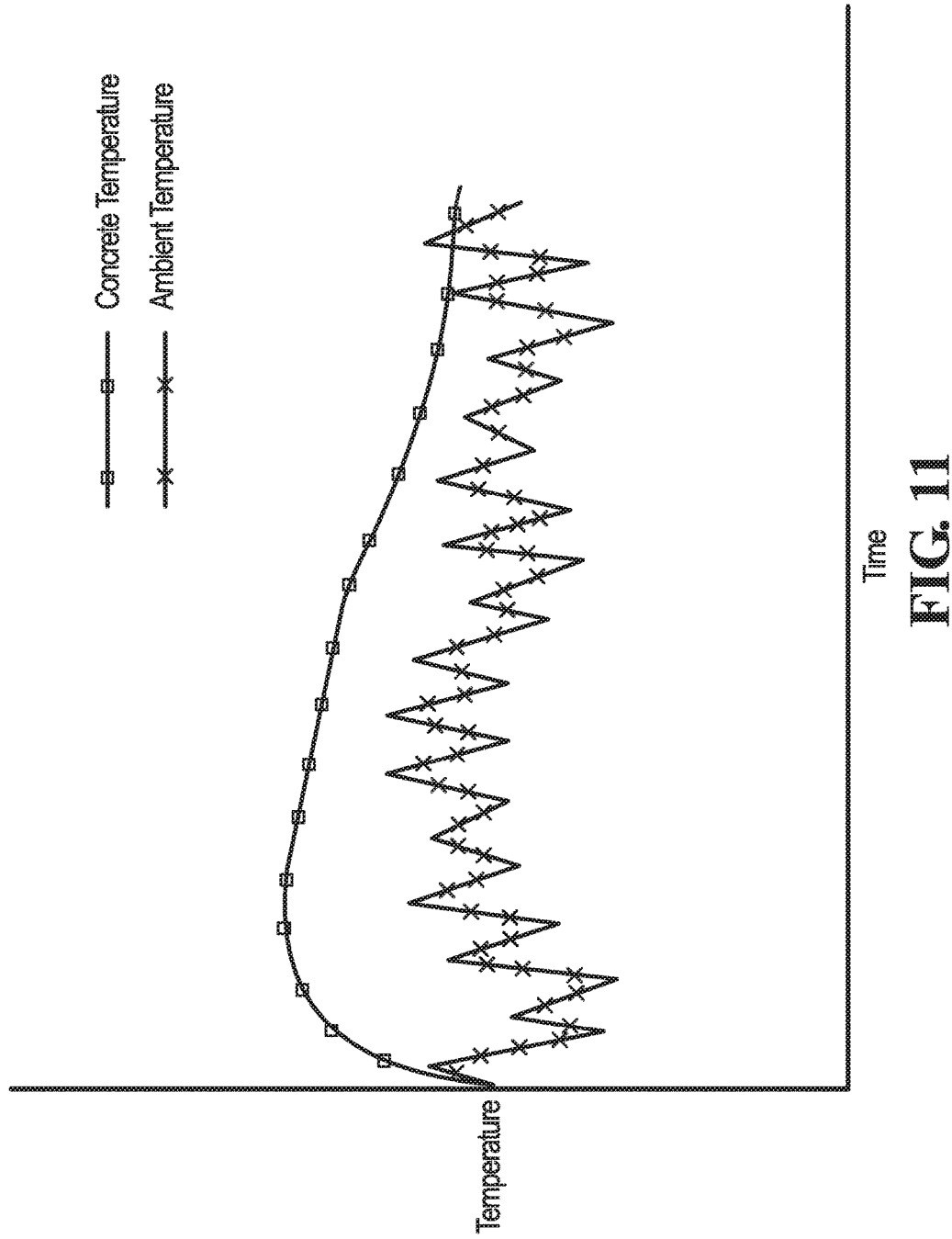
FIG. 11 is a graph of concrete temperature versus elapsed concrete curing time of a disclosed embodiment of a curing temperature profile for concrete in accordance with the present invention. An example of ambient temperature is also shown on the graph.

FIG. 11 shows a graph of a disclosed embodiment of a desired curing temperature profile for concrete as a function of time. In this graph, the temperature of the concrete is shown on the vertical axis and elapsed concrete curing time is shown on the horizontal axis. The intersection of the vertical and horizontal axes represents 0° C. concrete temperature and zero elapsed concrete curing time. Ambient temperature is also shown on this graph. The peaks and troughs of the ambient temperature represent the daily (i.e., day to night) fluctuation of ambient temperature. As can be seen in this graph, the temperature of the concrete initially increases quite rapidly over a relatively short time, such as 1 to 3 days. After a period of time, the concrete temperature reaches a maximum and then slowly drops to ambient temperature over an extended period, such as 1 to 7 days, preferably 1 to 14 days, more preferably 1 to 28 days, especially 3 to 5 days or more especially 5 to 7 days. The maximum temperature will vary depending on the composition of the concrete mix. However, it is desirable that the maximum temperature is at least 35° C., preferably, at least 40° C., at least 45° C., at least 50° C., at least 55° C., at least 60° C. or at least 65° C. The maximum concrete temperature should not exceed about 70° C. The maximum concrete temperature is preferably about 70° C., about 69° C., about 68° C., about 67° C., about 66° C., about 65° C., about 64° C., about 63° C., about 62° C., about 61° C., about 60° C. or about 60 to about 70° C. Furthermore, it is desirable that the temperature of the concrete is maintained above approximately 30° C., approximately 35° C., approximately 40° C., approximately 45° C., approximately 50° C., approximately 55° C. or approximately 60° C. for 1 to approximately 4 days from the time of concrete placement, preferably 1 to approximately 3 days from the time of concrete placement, more preferably about 1 hour to about 3 days from the time of concrete placement, most preferably about 1 hour to about 2 days from the time of concrete placement, especially about 1 hour to about 24 hours. It is also desirable that the temperature of the concrete is maintained above approximately 30° C. for 1 to approximately 7 days from the time of concrete placement, preferably above approximately 35° C. for 1 to approximately 7 days from the time of concrete placement, more preferably above approximately 40° C. for 1 to approximately 7 days from the time of concrete placement, most preferably above approximately 45° C. for 1 to approximately 7 days from the time of concrete placement. It is also desirable that the temperature of the concrete be maintained above ambient temperature for 1 to approximately 3 days from the time of concrete placement; 1 to approximately 5 days from the time of concrete placement, for 1 to approximately 7 days from the time of concrete placement, for 1 to approximately 14 days from the time of concrete placement, preferably approximately 3 to approximately 14 days from the time of concrete placement, especially approximately 7 to approximately 14 days from the time of concrete placement. It is also desirable that the temperature of the concrete be maintained above ambient temperature for approximately 3 days, approximately 5 days, approximately 7 days or approximately 14 days from the time of concrete placement. It is further desirable that the temperature of the concrete be reduced from the maximum temperature to ambient temperature gradually, such as in increments of approximately 0.5 to approximately 5° C. per day, preferably approximately 1 to approximately 2° C. per day, especially approximately 1° C. per day. The electrically heated flying table form is preferably kept on the curing concrete until the concrete is strong enough such that cracking due to temperature shrinkage will not occur from further cooling. Different curing temperature profiles may apply to different concrete mix designs and/or different materials used for the cementitious portion of the concrete mix in order to achieve a desired concrete strength or a desired concrete strength within a desired period of time in different weather conditions. However, all curing temperature profiles in accordance with the present invention will have the same general shape as shown in FIG. 11 relative to ambient temperature. Thus, as used herein the term "temperature profile" includes increasing the concrete temperature above ambient temperature over a period of time followed by decreasing the concrete temperature over a period of time, preferably to ambient temperature, wherein the slope of a line plotting temperature versus time during the temperature increase phase is greater than the absolute value of the slope of a line plotting temperature versus time during the temperature decrease phase. Furthermore, the absolute value of the slope of a line plotting temperature versus time during the temperature decrease phase of the temperature profile in a concrete form in accordance with the present invention is less than the absolute value of the slope of a line plotting temperature versus time if all added heat were stopped and the concrete were simply allowed to cool in a conventional concrete form; i.e., an uninsulated concrete form, under the same conditions. The term "temperature profile" includes the specific ranges of temperature increase and ranges of temperature decrease over ranges of time as set forth above with respect to FIG. 11. The term "temperature profile" includes increasing the temperature of curing concrete in a concrete form or mold to a maximum temperature at least 10% greater than the maximum temperature the same concrete mix would have reached in a conventional (i.e., non-insulated) concrete form or mold of the same configuration. The term "temperature profile" also includes reducing the temperature of curing concrete in a concrete form or mold from its maximum temperature at a rate slower than the rate the same concrete mix would reduce from its maximum temperature in a conventional (i.e., non-insulated) concrete form or mold of the same configuration. The principle behind concrete maturity is the relationship between strength, time, and temperature in young concrete. Maturity is a powerful and accurate means to predict early strength gain. Concrete maturity is measured as "equivalent age" and is given in temperature degrees x hours (either ° C.-Hrs or ° F.-Hrs). The term "temperature profile" includes controlling the temperature of curing concrete so that at 3 days it has a concrete maturity or equivalent age at least 25% greater than the same concrete mix would have in a conventional (i.e., non-insulated) concrete form or mold of the same configuration under the same conditions; preferably at least 30% greater, more preferably at least 35% greater, most preferably at least 40% greater, especially at least 45% greater, more especially at least 50% greater. The term "temperature profile" includes controlling the temperature of curing concrete so that at 3 days it has a concrete maturity or equivalent age about 70% greater than the same concrete mix would have when cured in accordance with ASTM C-39; preferably at least 75% greater, more preferably at least 80% greater, most preferably at least 85% greater, especially at least 90% greater, more especially at least 95% greater, most especially at least 100% greater. The term "temperature profile" includes controlling the temperature of curing concrete so that at 7 days it has a concrete maturity or equivalent age about 70% greater than the same concrete mix would have when cured in accordance with ASTM C-39; preferably at least 75% greater, more preferably at least 80% greater, most preferably at least 85% greater, especially at least 90% greater, more especially at least 95% greater, most especially at least 100% greater. The term "temperature profile" specifically does not include adding a constant amount of heat to the concrete followed by stopping adding heat to the concrete, such as would be involved when turning an electrically heated blanket or heated concrete form on and then turning the heated blanket or heated concrete form off. The term "temperature profile" specifically does not include maintaining the concrete at a constant temperature followed by stopping adding heat to the concrete, such as would be involved when turning an electrically heated blanket or heated concrete form on and then turning the heated blanket or heated concrete form off. The term "temperature profile" also specifically does not include heating the concrete to a desired temperature and then stopping adding heat to the concrete.

Figure 12:
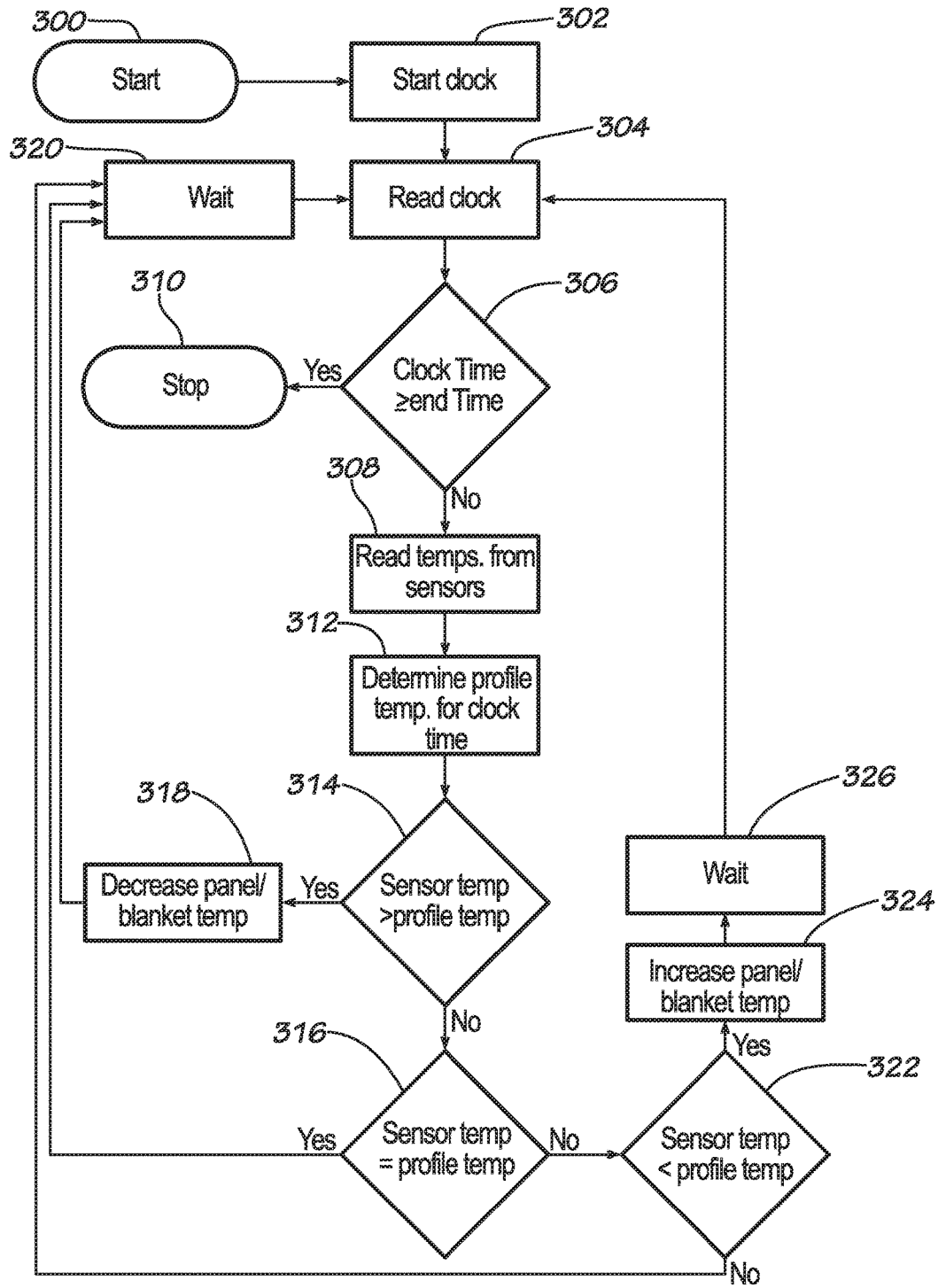
FIG. 12 is a flow diagram of another disclosed embodiment of a temperature controlled concrete curing process utilizing an electrically heated concrete deck form used with a flying table form in accordance with the present invention.

FIG. 12 shows an alternate disclosed embodiment of a flow diagram for a process for controlling the heat provided to concrete so that the temperature of the concrete can be controlled to follow a desired predetermined temperature profile, such as that shown in FIG. 11, using the electrically heated blanket 72 of the insulated flying table form 10 (FIGS. 1-6) or the electrically heated deck 102 of the electrically heated flying table form 100 (FIGS. 7-9). The computing devices 76, 134 are programmed so that they will perform the process shown by this flow diagram.

The process starts at the block 300 and proceeds to the block 302 where a clock is initialized to time equal to zero and the clock is started. The clock measures the elapsed time from when the concrete 68 is placed within the insulated flying table form 10 (FIGS. 1-6) or concrete 128 is place within the electrically heated flying table form 100 (FIGS. 7-9). This elapsed time therefore is a measure of the elapsed time for the curing of the concrete 68, 128.

The process proceeds from the block 302 to the block 304 where the clock is read. The time that is read from the clock is then stored in a memory location, such as in the RAM memory of the computing device 76, 134. The process proceeds from the block 304 to the decision block 306. A desired end time for terminating the process, such as 1 hour to 7 days, is preprogrammed into a memory location in the computing device 76, 134. At the block 306, the clock time stored in the memory location is compared to the end time stored in the memory location of the computing device 76, 134. If the clock time is less than the end time, the process proceeds to the block 308. If the clock time is greater than or equal to the end time, the process proceeds to the block 310 where the process is terminated.

At the block 308, the temperature from the blanket temperature sensor 74 (or optionally the temperature sensor 86) of the insulated flying table form 10 or the temperature sensor 132 of the electrically heated flying table form 100 is read and stored in a memory location, such as in the RAM memory of the computing device 76, 134. The process then proceeds from the block 308 to the block 312.

At the block 312 the temperature from the predetermined temperature profile is determined for the clock time stored in the memory location. This can be done from the temperature profile curve, such as the curve shown in FIG. 11. The clock time is found on the horizontal axis and the temperature is determined by finding the vertical axis component of the curve for the time corresponding to the clock time. When this temperature is determined, it is stored in a memory location, such as in the RAM memory of the computing device 76, 134. In an alternate disclosed embodiment, instead of using a graph, such as shown in FIG. 11, the temperature profile can be in the form of a lookup table. The lookup table lists a range of times and a profile temperature corresponding to each range of time. The process then proceeds from the block 312 to the decision block 314.

At the decision block 314 the temperature of the concrete 68, 128, which in this case is assumed to be the temperature of the electrically heated blanket 72 as measured by the sensor 74 (or optionally the temperature measured by the temperature sensor 86) or the temperature of the first panel 104 of the electrically heated deck 102 as measured by the sensor 132. If the blanket/panel temperature is greater than the profile temperature, the process proceeds to the block 318. When this condition is encountered, the temperature of the concrete 68, 128 is greater than the profile temperature, so it is not necessary to provide additional heat to the concrete so that the temperature of the concrete will equal the profile temperature. Therefore, at the block 318 the temperature of the electrically heated blanket 72 or the first panel 104 is decreased. This can be done by the computing device 76, 134 sending a signal to the blanket/panel temperature controller 80, 138 to reduce the temperature of the electrically heated blanket 72 or the temperature of the first panel 104. This is done by the temperature controller 80, 138 providing a reduced electrical voltage to the electric resistance heating wire (not shown) of the electrically heated blanket 72 or the electric resistance heating wire 108 associated with the first panel 104 or reducing the time that the electric resistance heating wire is energized. The process then proceeds from the block 318 to the block 320. At the block 320, a predetermined wait time is executed before the process proceeds from the block 320 to the block 304. The wait time can be any desired time that is suitable for the concrete temperature being measured, such as one second or ten seconds or 30 seconds or one minute or one hour. If the temperature of the electrically heated blanket 72 or the temperature of the first panel 104 is less than or equal to the profile temperature, the process proceeds to the decision block 316.

At the decision block 316, the temperature of the electrically heated blanket 72 as measured by the temperature sensor 74 (or optionally the temperature measured by the temperature sensor 86) or the temperature of the first panel 104 as measured by the sensor 132 is compared to the profile temperature corresponding to the stored clock time. If the temperature of the electrically heated blanket 72 or the temperature of the first panel 104 is equal to the profile temperature, the process proceeds from the block 316 to the block 320. If the temperature of the electrically heated blanket 72 (or optionally the temperature measured by the temperature sensor 86) or the temperature of the first panel 104 is not equal to the profile temperature, the process proceeds to the decision block 322.

At the decision block 322, the temperature of the electrically heated blanket 72 as measured by the sensor 74 (or optionally the temperature measured by the temperature sensor 86) or the temperature of the first panel 104 as measured by the sensor 132 is compared to the profile temperature. If the temperature of the electrically heated blanket 72 or the temperature of the first panel 104 is greater than or equal to the profile temperature, the process proceeds to the block 320. If the temperature of the electrically heated blanket 72 or the temperature of the first panel 104 is less than the profile temperature, the process proceeds to the block 324.

At the block 324 the temperature of the electrically heated blanket 72 or the temperature of the first panel 104 is increased. This can be done by the computing device 76, 134 sending a signal to the blanket/panel temperature controller 80, 138 to increase the temperature of the electrically heated blanket 72 or the first panel 104. This can be done by the blanket/panel temperature controller 80, 138 providing a greater electrical voltage to the electrical resistance heating wire (not shown) of the electrically heated blanket 72 or the electrical resistance heating wire 108 associated with the first panel 104 or increasing the time that the electric resistance heating wire is energized. The process then proceeds from the block 324 to the block 326.

At the decision block 326, a predetermined wait time is executed before the process proceeds from the block 326 to the block 304. The wait time can be any desired time that is suitable for the concrete 68, 128 temperature being measured, such as one second or ten seconds or 30 seconds or one minute or one hour. The process then proceeds from the block 326 to the block 304 where a new clock time is read.

The foregoing process regulates the heat provided by the electrically heated blanket 72 or the first panel 104 so that the temperature of the concrete 68, 128 is equal to the profile temperature at any given time. When the temperature of the concrete 68, 128 is less than the profile temperature at a given time, the electrically heated blanket 72 or the first panel 104 provide heat to the concrete until the temperature of the concrete is equal to the profile temperature. When the temperature of the concrete 68, 128 is greater than the profile temperature at a given time, no additional heat, or a reduced amount of heat, is provided to the concrete. Thus, the concrete 68, 128 temperature is continuously monitored and adjusted so that over time the concrete temperature follows the predetermined temperature profile. Thus, over a predetermined time period the concrete temperature is maintained at predetermined levels and then gradually reduced to ambient temperature at a predetermined rate.

Although the present invention is illustrated showing an single insulated flying table concrete form 10 and a single electrically heated concrete flying table concrete form 100, in actual use multiple insulated flying table forms or multiple electrically heated flying table forms 102 can be connected together as described above. For some applications, there may be as many as 100 or more insulated deck forms 12 or electrically heated deck forms 102 used to construct a desired structure. As with prior art concrete forms, the insulated deck forms 12 and the electrically heated deck forms 102 of the present invention are attached side-by-side and/or end-to-end to provide an insulated flying table form or an electrically heated flying table concrete form of a desired length, width and shape for a particular project. If each form had to be wired to a central computer, it would create a dangerous maze of wires that could pose a serious trip hazard and the wires could easily come undone or damaged. The present invention solves this problem by wiring each electrically heated blanket 72 or each electrically heated deck form 102 to each adjacent blanket or deck form, attaching an addressable controller to each blanket or to each deck form and networking all of the blankets or deck forms so that each blanket or deck form can be monitored and controlled individually by a central computing device, especially wirelessly. It is specifically contemplated that the electrically heated blanket 72 or the electrically heated deck forms 102 can be networked together to form a local area network in the same manner as disclosed in applicant's co-pending patent application Ser. No. 13/626,075 filed Sep. 25, 2012 (the disclosure of which is incorporated herein by reference in its entirety). By networking the electrically heated blankets 72 associated with the insulated flying table form 10 or the electrically heated deck forms 102 associated with the electrically heated concrete flying table concrete forms 100, the temperature of each form can be separately monitored and adjusted to a desired temperature using a centrally located computing device that is either wired to the local area network or wirelessly connected to the local area network.

In the electrically heated blanket 72 and the electrically heated deck form 102, the electrical resistance heating element, such as the electrical resistance heated wire 108, can be substituted with an infrared producing device, such as disclosed in U.S. Pat. No. 4,602,238 and U.S. Patent Application Publication No. 2009/0324811 (the disclosures of which are both incorporated herein by reference) or a far infrared producing device, such as disclosed in U.S. Pat. Nos. 7,009,155 and 7,827,675 and U.S. Patent Application Publication Nos. 2003/0049473; 2003/0155347; 2009/0312822 and 2010/0062667 (the disclosures of which are all incorporated herein by reference in their entirety).

While the present invention can be used with conventional concrete mixes; i.e., concrete in which portland cement is the only cementitious material used in the concrete, it is preferred as a part of the present invention to use the concrete or mortar mixes disclosed below or disclosed in applicant's co-pending patent application Pub. No. US 2013/0119576 (the disclosure of which is incorporated herein by reference in its entirety). Specifically, the concrete mix in accordance with the present invention comprises cementitious material, aggregate and water sufficient to hydrate the cementitious material. The amount of cementitious material used relative to the total weight of the concrete varies depending on the application and/or the strength of the concrete desired. Generally speaking, however, the cementitious material comprises approximately 25% to approximately 40% by weight of the total weight of the concrete, exclusive of the water, or 300 lbs/yd$^3$ (177 kg/m$^3$) of cement to 1,200 lbs/yd$^3$ (710 kg/m$^3$) of cement. In Ultra High Performance Concrete, the cementitious material exceeds the 40% by weight of the total weight of the concrete. The water-to-cement ratio by weight is usually approximately 0.25 to approximately 0.7. Relatively low water-to-cement materials ratios by weight lead to higher strength but lower workability, while relatively high water-to-cement materials ratios by weight lead to lower strength, but better workability. For high performance concrete and ultra high performance concrete, lower water-to-cement ratios are used, such as approximately 0.15 to approximately 0.25. Aggregate usually comprises 70% to 80% by volume of the concrete. In Ultra High Performance concrete the aggregate is less than 70% of the concrete by volume. However, the relative amounts of cementitious material to aggregate to water are not a critical feature of the present invention; conventional amounts can be used. Nevertheless, sufficient cementitious material should be used to produce concrete with an ultimate compressive strength of at least 1,000 psi, preferably at least 2,000 psi, more preferably at least 3,000 psi, most preferably at least 4,000 psi, especially up to about 10,000 psi or more. In particular, Ultra High Performance concrete, concrete panels or concrete elements with compressive strengths of over 20,000 psi can be cast and cured using the method of the present invention.

The aggregate used in the concrete used with the present invention is not critical and can be any aggregate typically used in concrete. The aggregate that is used in the concrete depends on the application and/or the strength of the concrete desired. Such aggregate includes, but is not limited to, fine aggregate, medium aggregate, coarse aggregate, sand, gravel, crushed stone, lightweight aggregate, recycled aggregate, such as from construction, demolition and excavation waste, and mixtures and combinations thereof.

The reinforcement of the concrete used with the present invention is not a critical aspect of the present invention and thus any type of reinforcement required by design requirements can be used. Such types of concrete reinforcement include, but are not limited to, deformed steel bars, cables, post tensioned cables, pre-stressed cables, fibers, steel fibers, mineral fibers, synthetic fibers, carbon fibers, steel wire fibers, mesh, lath, and the like.

The preferred cementitious material for use with the present invention comprises portland cement; preferably portland cement and one or more pozzolans; and more preferably portland cement, slag cement and one or more pozzolans. The cementitious material preferably comprises a reduced amount of portland cement and increased amounts of recycled supplementary cementitious materials; i.e., slag cement and/or fly ash. This results in cementitious material and concrete that is more environmentally friendly. The portland cement can also be replaced, in whole or in part, by one or more pozzolanic materials. Portland cement is a hydraulic cement. Hydraulic cements harden because of a hydration process; i.e., a chemical reaction between the anhydrous cement powder and water. Thus, hydraulic cements can harden underwater or when constantly exposed to wet weather. The chemical reaction results in hydrates that are substantially water-insoluble and so are quite durable in water. Hydraulic cement is a material that can set and harden submerged in water by forming insoluble products in a hydration reaction. Other hydraulic cements include, but are not limited to, belite cement (dicalcium silicate), phosphate cements and anhydrous gypsum. However, the preferred hydraulic cement is portland cement.

Another preferred cementitious material for use with the present invention comprises portland cement; preferably portland cement and one of slag cement or fly ash; and more preferably portland cement, slag cement and fly ash. Slag cement is also known as ground granulated blast-furnace slag (GGBFS). The cementitious material preferably comprises a reduced amount of or no portland cement and increased amounts of recycled supplementary cementitious materials; e.g., slag cement, fly ash, energetically modified cement and/or volcanic ash. This results in cementitious material and concrete that is more environmentally friendly. The portland cement can also be replaced, in whole or in part, by one or more cementitious materials other than portland cement, slag cement or fly ash. Such other cementitious or pozzolanic materials include, but are not limited to, silica fume; metakaolin; rice hull (or rice husk) ash; ground burnt clay bricks; brick dust; bone ash; animal blood; clay; volcanic ash, energetically modified cement, other siliceous, aluminous or aluminosiliceous materials that react with calcium hydroxide in the presence of water; hydroxide-containing compounds, such as sodium hydroxide, magnesium hydroxide, or any other compound having reactive hydrogen groups, other hydraulic cements, other pozzolanic materials and combinations thereof. The portland cement can also be replaced, in whole or in part, by one or more inert or filler materials other than portland cement, slag cement or fly ash. Such other inert or filler materials include, but are not limited to limestone powder; calcium carbonate; titanium dioxide; quartz; or other finely divided minerals that densify the hydrated cement paste.

Slag cement, also known as ground granulated blast-furnace slag (GGBFS) and fly ash are both pozzolans. Pozzolan is a siliceous or siliceous and aluminous material which, in itself, possesses little or no cementitious value but which will, in finely divided form and in the presence of water, react chemically with calcium hydroxide at ordinary temperature to form compounds possessing cementitious properties. Such pozzolanic materials include, but are not limited to, volcanic ash, silica fume; metakaolin; rice hull (or rice husk) ash; ground burnt clay bricks; brick dust; bone ash; calcined shale; calcined clay; other siliceous, aluminous or aluminosiliceous materials that react with calcium hydroxide in the presence of water; hydroxide-containing compounds, such as sodium hydroxide, magnesium hydroxide, or any other compound having reactive hydrogen groups. The portland cement can also be replaced, in whole or in part, by one or more inert or filler materials other than portland cement, slag cement or pozzolanic material. Such other inert or filler materials include, but are not limited to limestone powder; calcium carbonate; titanium dioxide; quartz; or other finely divided minerals that densify the hydrated cement paste. In one disclosed embodiment, the cementitious material for use with the present invention comprises one or more hydraulic cements and one or more pozzolans.

The preferred cementitious material for use with a disclosed embodiment of the present invention comprises 0% to approximately 100% by weight portland cement. The range of 0% to approximately 100% by weight portland cement includes all of the intermediate percentages; such as, 5%, 10%, 15%, 20%, 25%, 30%, 35%, 40%, 45%, 50%, 55%, 60%, 65%, 70%, 75%, 80%, 85%, 90% and 95%. The cementitious material of the present invention can also comprise 0% to approximately 90% by weight portland cement, preferably 0% to approximately 80% by weight portland cement, preferably 0% to approximately 70% by weight portland cement, more preferably 0% to approximately 60% by weight portland cement, most preferably 0% to approximately 50% by weight portland cement, especially 0% to approximately 40% by weight portland cement, more especially 0% to approximately 30% by weight portland cement, most especially 0% to approximately 20% by weight portland cement, or 0% to approximately 10% by weight portland cement. In one disclosed embodiment, the cementitious material comprises approximately 10% to approximately 45% by weight portland cement, more preferably approximately 10% to approximately 40% by weight portland cement, most preferably approximately 10% to approximately 35% by weight portland cement, especially approximately 33⅓% by weight portland cement, most especially approximately 10% to approximately 30% by weight portland cement. In another disclosed embodiment of the present invention, the cementitious material can comprise approximately 5% by weight portland cement, approximately 10% by weight portland cement, approximately 15% by weight portland cement, approximately 20% by weight portland cement, approximately 25% by weight portland cement, approximately 30% by weight portland cement, approximately 35% by weight portland cement, approximately 40% by weight portland cement, approximately 45% by weight portland cement or approximately 50% by weight portland cement or any sub-combination thereof.

The preferred cementitious material for use in one disclosed embodiment of the present invention also comprises 0% to approximately 80% by weight of one or more pozzolans, preferably approximately 10% to approximately 80% by weight one or more pozzolans, preferably approximately 10% to approximately 75% by weight one or more pozzolans, preferably approximately 10% to approximately 70% by weight one or more pozzolans, preferably approximately 10% to approximately 65% by weight one or more pozzolans, preferably approximately 10% to approximately 60% by weight one or more pozzolans, preferably approximately 10% to approximately 55% by weight one or more pozzolans, preferably approximately 10% to approximately 80% by weight one or more pozzolans, preferably approximately 10% to approximately 45% by weight one or more pozzolans, more preferably approximately 10% to approximately 40% by weight one or more pozzolans, most preferably approximately 10% to approximately 35% by weight one or more pozzolans, especially approximately 33⅓% by weight one or more pozzolans. In another disclosed embodiment of the present invention, the preferred cementitious material comprises 0% by weight one or more pozzolans, approximately 5% by weight one or more pozzolans, approximately 10% by weight one or more pozzolans, approximately 15% by weight one or more pozzolans, approximately 20% by weight one or more pozzolans, approximately 25% by weight one or more pozzolans, approximately 30% by weight one or more pozzolans, approximately 35% by weight one or more pozzolans, approximately 40% by weight one or more pozzolans, approximately 45% by weight one or more pozzolans or approximately 80% by weight one or more pozzolans, approximately 55% by weight one or more pozzolans, approximately 60% by weight one or more pozzolans, approximately 65% by weight one or more pozzolans, approximately 70% by weight one or more pozzolans or approximately 75% by weight one or more pozzolans, approximately 80% by weight one or more pozzolans or any sub-combination thereof. Preferably the one or more pozzolans has an average particle size of <10 μm; more preferably 90% or more of the particles have a particles size of <10 μm.

The preferred cementitious material for use in one disclosed embodiment of the present invention also comprises 0% to approximately 90% by weight slag cement, preferably approximately 10% to approximately 90% by weight slag cement, preferably approximately 20% to approximately 90% by weight slag cement, more preferably approximately 30% to approximately 80% by weight slag cement, most preferably approximately 30% to approximately 70% by weight slag cement, especially approximately 30% to approximately 60% by weight slag cement, more especially approximately 30% to approximately 50% by weight slag cement, most especially approximately 30% to approximately 40% by weight slag cement. In another disclosed embodiment the cementitious material comprises approximately 33⅓% by weight slag cement. In another disclosed embodiment of the present invention, the cementitious material can comprise approximately 5% by weight slag cement, approximately 10% by weight slag cement, approximately 15% by weight slag cement, approximately 20% by weight slag cement, approximately 25% by weight slag cement, approximately 30% by weight slag cement, approximately 35% by weight slag cement, approximately 40% by weight slag cement, approximately 45% by weight slag cement, approximately 50% by weight slag cement, approximately 55% by weight slag cement, approximately 60% by weight slag cement, approximately 65%, approximately 70% by weight slag cement, approximately 75% by weight slag cement, approximately 80% by weight slag cement, approximately 85% by weight slag cement or approximately 90% by weight slag cement or any sub-combination thereof.

In one disclosed embodiment, the preferred pozzolans are fly ash or volcanic ash. Thus, preferred cementitious material for use in one disclosed embodiment of the present invention also comprises 0% to approximately 80% by weight of one or more pozzolans, preferably fly ash or volcanic ash, preferably approximately 10% to approximately 80% by weight fly ash or volcanic ash, preferably approximately 10% to approximately 75% by weight fly ash or volcanic ash, preferably approximately 10% to approximately 70% by weight fly ash or volcanic ash, preferably approximately 10% to approximately 65% by weight fly ash or volcanic ash, preferably approximately 10% to approximately 60% by weight fly ash or volcanic ash, preferably approximately 10% to approximately 55% by weight fly ash or volcanic ash, preferably approximately 10% to approximately 80% by weight fly ash or volcanic ash, preferably approximately 10% to approximately 45% by weight fly ash or volcanic ash, more preferably approximately 10% to approximately 40% by weight fly ash or volcanic ash, most preferably approximately 10% to approximately 35% by weight fly ash or volcanic ash, especially approximately 33⅓% by weight fly ash or volcanic ash. In another disclosed embodiment of the present invention, the preferred cementitious material comprises 0% by weight fly ash or volcanic ash, approximately 5% by weight fly ash or volcanic ash, approximately 10% by weight fly ash or volcanic ash, approximately 15% by weight fly ash or volcanic ash, approximately 20% by weight fly ash or volcanic ash, approximately 25% by weight fly ash or volcanic ash, approximately 30% by weight fly ash or volcanic ash, approximately 35% by weight fly ash or volcanic ash, approximately 40% by weight fly ash or volcanic ash, approximately 45% by weight fly ash or volcanic ash, approximately 55% by weight fly ash or volcanic ash, approximately 60% by weight fly ash or volcanic ash, approximately 65% by weight fly ash or volcanic ash, approximately 70% by weight fly ash or volcanic ash, approximately 75% by weight fly ash or volcanic ash, approximately 80% by weight fly ash or volcanic ash or any sub-combination thereof. Preferably the fly ash or volcanic ash has an average particle size of <10 μm; more preferably 90% or more of the particles have a particles size of <10 μm.

The cementitious material for use in one disclosed embodiment of the present invention can optionally include 0.1% to approximately 20% by weight Wollastonite, preferably 0.1% to approximately 10% by weight Wollastonite. Wollastonite is a calcium inosilicate mineral ($CaSiO_3$) that may contain small amounts of iron, magnesium, and manganese substituted for calcium. In addition the cementitious material can optionally include 0.1-35% calcium oxide (quick lime), calcium hydroxide (hydrated lime), calcium carbonate or latex or polymer admixtures, either mineral or synthetic, that have reactive hydroxyl groups or mixtures or combinations thereof.

The cementitious material for use in one disclosed embodiment of the present invention can also optionally include inert fillers, such as limestone powder; calcium carbonate; titanium dioxide; quartz; or other finely divided minerals that densify the hydrated cement paste. Specifically, inert fillers optionally can be used in the cementitious material of the present invention in amounts of 0% to approximately 40% by weight; preferably, approximately 1% to approximately 30% by weight. In one disclosed embodiment, the cementitious material for use with the present invention comprises 0% to approximately 100% by weight portland cement, approximately 10% to approximately 90% by weight slag cement, approximately 5% to approximately 80% by weight one or more pozzolans and 0% to approximately 40% by weight inert filler. In another disclosed embodiment, the cementitious material for use with the present invention comprises approximately 10% to approximately 100% by weight portland cement; approximately 5% to approximately 80% by weight one or more pozzolans; and 1% to approximately 40% by weight inert filler.

In one disclosed embodiment, the preferred cementitious material for use with the present invention comprises approximately equal parts by weight of portland cement, slag cement and one or more pozzolans; i.e., approximately 33⅓% by weight portland cement, approximately 33⅓% by weight slag cement and approximately 33⅓% by weight one or more pozzolans. In another disclosed embodiment, a preferred cementitious material for use with the present invention has a weight ratio of portland cement to slag cement to one or more pozzolans of 1:1:1. In another disclosed embodiment, the preferred cementitious material for use with the present invention has a weight ratio of portland cement to slag cement to one or more pozzolans of approximately 0.85-1.15:0.85-1.15:0.85-1.15, preferably approximately 0.9-1.1:0.9-1.1:0.9-1.1, more preferably approximately 0.95-1.05:0.95-1.05:0.95-1.05.

In one disclosed embodiment, the cementitious material for use with the present invention comprises approximately 10% to approximately 100% by weight portland cement, approximately 10% to approximately 90% by weight slag cement, and approximately 5% to approximately 80% by weight one or more pozzolans preferably fly ash or volcanic ash. In one disclosed embodiment, the cementitious material for use with the present invention comprises approximately 10% to approximately 80% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises approximately 10% to approximately 70% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises approximately 10% to approximately 60% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises approximately 10% to approximately 50% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises less than 50% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises approximately 10% to approximately 45% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises approximately 10% to approximately 40% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises approximately 10% to approximately 35% by weight portland cement, approximately 10% to approximately 90% by weight slag cement, and approximately 5% to approximately 80% by weight one or more pozzolans preferably fly ash or volcanic ash.

In one disclosed embodiment, the cementitious material for use with the present invention comprises 0% to approximately 100% by weight portland cement, approximately 10% to approximately 90% by weight slag cement, and approximately 5% to approximately 80% by weight one or more pozzolans preferably fly ash or volcanic ash. In one disclosed embodiment, the cementitious material for use with the present invention comprises 0% to approximately 80% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises 0% to approximately 70% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises 0% to approximately 60% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises 0% to approximately 50% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises 0% to approximately 45% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises 0% to approximately 40% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises 0% to approximately 35% by weight portland cement, approximately 10% to approximately 90% by weight slag cement, and approximately 5% to approximately 80% by weight one or more pozzolans preferably fly ash or volcanic ash.

In another disclosed embodiment, the cementitious material for use with the present invention comprises approximately 10% to approximately 100% by weight portland cement and at least one of approximately 10% to approximately 90% by weight slag cement and approximately 5% to approximately 80% by weight one or more pozzolans preferably fly ash. In another disclosed embodiment, the cementitious material for use with the present invention comprises approximately 10% to approximately 90% by weight portland cement and at least one of approximately 10% to approximately 90% by weight slag cement and approximately 5% to approximately 80% by weight one or more pozzolans preferably fly ash. In another disclosed embodiment, the cementitious material for use with the present invention comprises approximately 10% to approximately 80% by weight portland cement and at least one of approximately 10% to approximately 90% by weight slag cement and approximately 5% to approximately 80% by weight one or more pozzolans preferably fly ash. In another disclosed embodiment, the cementitious material for use with the present invention comprises approximately 10% to approximately 70% by weight portland cement and at least one of approximately 10% to approximately 90% by weight slag cement and approximately 5% to approximately 80% by weight one or more pozzolans preferably fly ash. In another disclosed embodiment, the cementitious material for use with the present invention comprises approximately 10% to approximately 60% by weight portland cement and at least one of approximately 10% to approximately 90% by weight slag cement and approximately 5% to approximately 80% by weight one or more pozzolans preferably fly ash. In another disclosed embodiment, the cementitious material for use with the present invention comprises approximately 10% to approximately 50% by weight portland cement and at least one of approximately 10% to approximately 90% by weight slag cement and approximately 5% to approximately 80% by weight one or more pozzolans preferably fly ash. In another disclosed embodiment, the cementitious material for use with the present invention comprises approximately 10% to approximately 40% by weight portland cement and at least one of approximately 10% to approximately 90% by weight slag cement and approximately 5% to approximately 80% by weight one or more pozzolans preferably fly ash.

In another disclosed embodiment, the cementitious material for use with the present invention comprises approximately 10% to approximately 90% by weight portland cement; approximately 10% to approximately 90% by weight slag cement; 0% to approximately 80% by weight one or more pozzolans preferably fly ash or volcanic ash; 0% to 10% by weight Wollastonite; and 0% to approximately 25% by weight calcium oxide, calcium hydroxide, or latex or polymer admixtures, either mineral or synthetic, that have reactive hydroxyl groups, or mixtures thereof. In one disclosed embodiment, the cementitious material for use with the present invention comprises approximately 10% to approximately 80% by weight portland cement; approximately 10% to approximately 90% by weight slag cement; 0% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 70% by weight portland cement; approximately 10% to approximately 90% by weight slag cement; 0% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 60% by weight portland cement; approximately 10% to approximately 90% by weight slag cement; 0% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 50% by weight portland cement; approximately 10% to approximately 90% by weight slag cement; 0% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight portland cement; approximately 10% to approximately 90% by weight slag cement; approximately 10% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 45% by weight portland cement; approximately 10% to approximately 90% by weight slag cement; 10% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 40% by weight portland cement; approximately 10% to approximately 90% by weight slag cement; approximately 10% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 35% by weight portland cement; approximately 10% to approximately 90% by weight slag cement; approximately 10% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material for use with the present invention comprises at least one of approximately 10% to approximately 100% by weight portland cement, approximately 10% to approximately 90% by weight slag cement or approximately 5% to approximately 80% by weight one or more pozzolans preferably fly ash or volcanic ash; 0% to 10% by weight Wollastonite; and 0% to approximately 25% by weight calcium oxide, calcium hydroxide, or latex or polymer admixtures, either mineral or synthetic, that have reactive hydroxyl groups, or mixtures thereof. In one disclosed embodiment, the cementitious material for use with the present invention comprises at least one of approximately 10% to approximately 80% by weight portland cement, approximately 10% to approximately 90% by weight slag cement or approximately 5% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 70% by weight portland cement, approximately 10% to approximately 90% by weight slag cement or approximately 5% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 60% by weight portland cement, approximately 10% to approximately 90% by weight slag cement or approximately 5% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 50% by weight portland cement, approximately 10% to approximately 90% by weight slag cement or approximately 5% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight portland cement; approximately 10% to approximately 90% by weight slag cement; approximately 10% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 45% by weight portland cement, approximately 10% to approximately 90% by weight slag cement or approximately 10% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 40% by weight portland cement, approximately 10% to approximately 90% by weight slag cement or approximately 10% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 35% by weight portland cement, approximately 10% to approximately 90% by weight slag cement or approximately 10% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material for use with the present invention comprises approximately 10% to approximately 90% by weight portland cement; at least one of approximately 10% to approximately 90% by weight slag cement or approximately 5% to approximately 80% by weight one or more pozzolans preferably fly ash or volcanic ash; and 0.1% to 10% by weight Wollastonite. In one disclosed embodiment, the cementitious material for use with the present invention comprises approximately 10% to approximately 80% by weight portland cement; at least one of approximately 10% to approximately 90% by weight slag cement or approximately 5% to approximately 80% by weight one or more pozzolans preferably fly ash or volcanic ash; and 0.1% to approximately 10% by weight Wollastonite. In another disclosed embodiment, the cementitious material for use with the present invention comprises approximately 10% to approximately 70% by weight portland cement; at least one of approximately 10% to approximately 90% by weight slag cement or approximately 5% to approximately 80% by weight one or more pozzolans preferably fly ash or volcanic ash; and 0.1% to approximately 10% by weight Wollastonite. In another disclosed embodiment, the cementitious material for use with the present invention comprises approximately 10% to approximately 60% by weight portland cement; at least one of approximately 10% to approximately 90% by weight slag cement or approximately 5% to approximately 80% by weight one or more pozzolans preferably fly ash or volcanic ash; and 0.1% to approximately 10% by weight Wollastonite. In another disclosed embodiment, the cementitious material for use with the present invention comprises approximately 10% to approximately 50% by weight portland cement; at least one of approximately 10% to approximately 90% by weight slag cement or approximately 5% to approximately 80% by weight one or more pozzolans preferably fly ash or volcanic ash; and 0.1% to approximately 10% by weight Wollastonite. In another disclosed embodiment, the cementitious material for use with the present invention comprises less than 50% by weight portland cement; at least one of approximately 10% to approximately 90% by weight slag cement or approximately 5% to approximately 80% by weight one or more pozzolans preferably fly ash or volcanic ash; and 0.1% to approximately 10% by weight Wollastonite. In another disclosed embodiment, the cementitious material for use with the present invention comprises approximately 10% to approximately 45% by weight portland cement; at least one of approximately 10% to approximately 90% by weight slag cement or approximately 5% to approximately 80% by weight one or more pozzolans preferably fly ash or volcanic ash; and 0.1% to approximately 10% by weight Wollastonite. In another disclosed embodiment, the cementitious material for use with the present invention comprises approximately 10% to approximately 40% by weight portland cement; at least one of approximately 10% to approximately 90% by weight slag cement or approximately 5% to approximately 80% by weight one or more pozzolans preferably fly ash or volcanic ash; and 0.1% to approximately 10% by weight Wollastonite. In another disclosed embodiment, the cementitious material for use with the present invention comprises approximately 10% to approximately 35% by weight portland cement; at least one of approximately 10% to approximately 90% by weight slag cement or approximately 5% to approximately 80% by weight one or more pozzolans preferably fly ash or volcanic ash; and 0.1% to approximately 10% by weight Wollastonite.

In one disclosed embodiment, the cementitious material for use with the present invention comprises approximately 10% to approximately 100% by weight portland cement, approximately 10% to approximately 90% by weight slag cement, and approximately 5% to approximately 80% by weight volcanic ash. In one disclosed embodiment, the cementitious material for use with the present invention comprises approximately 10% to approximately 80% by weight portland cement, approximately 10% to approximately 90% by weight slag cement, and approximately 5% to approximately 80% by weight volcanic ash. In another disclosed embodiment, the cementitious material for use with the present invention comprises approximately 10% to approximately 70% by weight portland cement, approximately 10% to approximately 90% by weight slag cement, and approximately 5% to approximately 80% by weight volcanic ash. In another disclosed embodiment, the cementitious material for use with the present invention comprises approximately 10% to approximately 60% by weight portland cement, approximately 10% to approximately 90% by weight slag cement, and approximately 5% to approximately 80% by weight volcanic ash. In another disclosed embodiment, the cementitious material for use with the present invention comprises approximately 10% to approximately 50% by weight portland cement, approximately 10% to approximately 90% by weight slag cement, and approximately 5% to approximately 80% by weight volcanic ash. In another disclosed embodiment, the cementitious material for use with the present invention comprises less than 50% by weight portland cement, approximately 10% to approximately 90% by weight slag cement, and approximately 5% to approximately 80% by weight volcanic ash. In another disclosed embodiment, the cementitious material for use with the present invention comprises approximately 10% to approximately 45% by weight portland cement, approximately 10% to approximately 90% by weight slag cement, and approximately 5% to approximately 80% by weight volcanic ash. In another disclosed embodiment, the cementitious material for use with the present invention comprises approximately 10% to approximately 40% by weight portland cement, approximately 10% to approximately 90% by weight slag cement, and approximately 5% to approximately 80% by weight volcanic ash. In another disclosed embodiment, the cementitious material for use with the present invention comprises approximately 10% to approximately 35% by weight portland cement, approximately 10% to approximately 90% by weight slag cement, and approximately 5% to approximately 80% by weight volcanic ash.

In one disclosed embodiment, the cementitious material for use with the present invention comprises approximately 10% to approximately 100% by weight portland cement, approximately 10% to approximately 90% by weight slag cement, approximately 5% to approximately 80% by weight volcanic ash and approximately 1% to approximately 25% by weight lime. In one disclosed embodiment, the cementitious material for use with the present invention comprises approximately 10% to approximately 80% by weight portland cement, approximately 10% to approximately 90% by weight slag cement, approximately 5% to approximately 80% by weight volcanic ash and approximately 1% to approximately 25% by weight lime. In another disclosed embodiment, the cementitious material for use with the present invention comprises approximately 10% to approximately 70% by weight portland cement, approximately 10% to approximately 90% by weight slag cement, approximately 5% to approximately 80% by weight volcanic ash and approximately 1% to approximately 25% by weight lime. In another disclosed embodiment, the cementitious material for use with the present invention comprises approximately 10% to approximately 60% by weight portland cement, approximately 10% to approximately 90% by weight slag cement, approximately 5% to approximately 80% by weight volcanic ash and approximately 1% to approximately 25% by weight lime. In another disclosed embodiment, the cementitious material for use with the present invention comprises approximately 10% to approximately 50% by weight portland cement, approximately 10% to approximately 90% by weight slag cement, approximately 5% to approximately 80% by weight volcanic ash and approximately 1% to approximately 25% by weight lime. In another disclosed embodiment, the cementitious material for use with the present invention comprises less than 50% by weight portland cement, approximately 10% to approximately 90% by weight slag cement, approximately 5% to approximately 80% by weight volcanic ash and approximately 1% to approximately 25% by weight lime. In another disclosed embodiment, the cementitious material for use with the present invention comprises approximately 10% to approximately 45% by weight portland cement, approximately 10% to approximately 90% by weight slag cement, approximately 5% to approximately 80% by weight volcanic ash and approximately 1% to approximately 25% by weight lime. In another disclosed embodiment, the cementitious material for use with the present invention comprises approximately 10% to approximately 40% by weight portland cement, approximately 10% to approximately 90% by weight slag cement, approximately 5% to approximately 80% by weight volcanic ash and approximately 1% to approximately 25% by weight lime. In another disclosed embodiment, the cementitious material for use with the present invention comprises approximately 10% to approximately 35% by weight portland cement, approximately 10% to approximately 90% by weight slag cement, approximately 5% to approximately 80% by weight volcanic ash and approximately 1% to approximately 25% by weight lime.

In one disclosed embodiment, the cementitious material for use with the present invention comprises approximately 10% to approximately 100% by weight portland cement, approximately 10% to approximately 90% by weight slag cement, and approximately 5% to approximately 30% by weight silica fume. In one disclosed embodiment, the cementitious material for use with the present invention comprises approximately 10% to approximately 80% by weight portland cement, approximately 10% to approximately 90% by weight slag cement, and approximately 5% to approximately 30% by weight silica fume. In another disclosed embodiment, the cementitious material for use with the present invention comprises approximately 10% to approximately 70% by weight portland cement, approximately 10% to approximately 90% by weight slag cement, and approximately 5% to approximately 30% by weight silica fume. In another disclosed embodiment, the cementitious material for use with the present invention comprises approximately 10% to approximately 60% by weight portland cement, approximately 10% to approximately 90% by weight slag cement, and approximately 5% to approximately 30% by weight silica fume. In another disclosed embodiment, the cementitious material for use with the present invention comprises approximately 10% to approximately 50% by weight portland cement, approximately 10% to approximately 90% by weight slag cement, and approximately 5% to approximately 30% by weight silica fume. In another disclosed embodiment, the cementitious material for use with the present invention comprises less than 50% by weight portland cement, approximately 10% to approximately 90% by weight slag cement, and approximately 5% to approximately 30% by weight silica fume. In another disclosed embodiment, the cementitious material for use with the present invention comprises approximately 10% to approximately 45% by weight portland cement, approximately 10% to approximately 90% by weight slag cement, and approximately 5% to approximately 30% by weight silica fume. In another disclosed embodiment, the cementitious material for use with the present invention comprises approximately 10% to approximately 40% by weight portland cement, approximately 10% to approximately 90% by weight slag cement, and approximately 5% to approximately 30% by weight silica fume. In another disclosed embodiment, the cementitious material for use with the present invention comprises approximately 10% to approximately 35% by weight portland cement, approximately 10% to approximately 90% by weight slag cement, and approximately 5% to approximately 30% by weight silica fume. In one disclosed embodiment, the cementitious material for use with the present invention comprises approximately 10% to approximately 90% by weight portland cement, 0% to approximately 90% by weight slag cement, and approximately 1% to approximately 40% by weight silica fume.

In one disclosed embodiment, the cementitious material for use with the present invention comprises approximately 10% to approximately 100% by weight portland cement, approximately 10% to approximately 90% by weight slag cement, and approximately 5% to approximately 40% by weight silica fume. In one disclosed embodiment, the cementitious material for use with the present invention comprises approximately 10% to approximately 80% by weight portland cement, approximately 10% to approximately 90% by weight slag cement, and approximately 5% to approximately 40% by weight silica fume. In another disclosed embodiment, the cementitious material for use with the present invention comprises approximately 10% to approximately 70% by weight portland cement, approximately 10% to approximately 90% by weight slag cement, and approximately 5% to approximately 40% by weight silica fume. In another disclosed embodiment, the cementitious material for use with the present invention comprises approximately 10% to approximately 60% by weight portland cement, approximately 10% to approximately 90% by weight slag cement, and approximately 5% to approximately 40% by weight silica fume. In another disclosed embodiment, the cementitious material for use with the present invention comprises approximately 10% to approximately 50% by weight portland cement, approximately 10% to approximately 90% by weight slag cement, and approximately 5% to approximately 40% by weight silica fume. In another disclosed embodiment, the cementitious material for use with the present invention comprises less than 50% by weight portland cement, approximately 10% to approximately 90% by weight slag cement, and approximately 5% to approximately 40% by weight silica fume. In another disclosed embodiment, the cementitious material for use with the present invention comprises approximately 10% to approximately 45% by weight portland cement, approximately 10% to approximately 90% by weight slag cement, and approximately 5% to approximately 40% by weight silica fume. In another disclosed embodiment, the cementitious material for use with the present invention comprises approximately 10% to approximately 40% by weight portland cement, approximately 10% to approximately 90% by weight slag cement, and approximately 5% to approximately 40% by weight silica fume. In another disclosed embodiment, the cementitious material for use with the present invention comprises approximately 10% to approximately 35% by weight portland cement, approximately 10% to approximately 90% by weight slag cement, and approximately 5% to approximately 40% by weight silica fume. In one disclosed embodiment, the cementitious material for use with the present invention comprises approximately 10% to approximately 90% by weight portland cement, 0% to approximately 90% by weight slag cement, and approximately 1% to approximately 40% by weight silica fume.

In one disclosed embodiment, the cementitious material for use with the present invention comprises approximately 10% to approximately 100% by weight portland cement, approximately 10% to approximately 90% by weight slag cement, approximately 5% to approximately 40% by weight silica fume and approximately 1% to approximately 25% by weight lime. In one disclosed embodiment, the cementitious material for use with the present invention comprises approximately 10% to approximately 80% by weight portland cement, approximately 10% to approximately 90% by weight slag cement, approximately 5% to approximately 40% by weight silica fume and approximately 1% to approximately 25% by weight lime. In another disclosed embodiment, the cementitious material for use with the present invention comprises approximately 10% to approximately 70% by weight portland cement, approximately 10% to approximately 90% by weight slag cement, approximately 5% to approximately 40% by weight silica fume and approximately 1% to approximately 25% by weight lime. In another disclosed embodiment, the cementitious material for use with the present invention comprises approximately 10% to approximately 60% by weight portland cement, approximately 10% to approximately 90% by weight slag cement, approximately 5% to approximately 40% by weight silica fume and approximately 1% to approximately 25% by weight lime. In another disclosed embodiment, the cementitious material for use with the present invention comprises approximately 10% to approximately 50% by weight portland cement, approximately 10% to approximately 90% by weight slag cement, approximately 5% to approximately 40% by weight silica fume and approximately 1% to approximately 25% by weight lime. In another disclosed embodiment, the cementitious material for use with the present invention comprises less than 50% by weight portland cement, approximately 10% to approximately 90% by weight slag cement, approximately 5% to approximately 40% by weight silica fume and approximately 1% to approximately 25% by weight lime. In another disclosed embodiment, the cementitious material for use with the present invention comprises approximately 10% to approximately 45% by weight portland cement, approximately 10% to approximately 90% by weight slag cement, approximately 5% to approximately 40% by weight silica fume and approximately 1% to approximately 25% by weight lime. In another disclosed embodiment, the cementitious material for use with the present invention comprises approximately 10% to approximately 40% by weight portland cement, approximately 10% to approximately 90% by weight slag cement, approximately 5% to approximately 40% by weight silica fume and approximately 1% to approximately 25% by weight lime. In another disclosed embodiment, the cementitious material for use with the present invention comprises approximately 10% to approximately 35% by weight portland cement, approximately 10% to approximately 90% by weight slag cement, approximately 5% to approximately 40% by weight silica fume and approximately 1% to approximately 25% by weight lime.

In one disclosed embodiment, the cementitious material for use with the present invention comprises approximately 10% to approximately 90% by weight portland cement, 0% to approximately 90% by weight slag cement, approximately 1% to approximately 40% by weight silica fume and approximately 1% to approximately 25% by weight lime.

In one disclosed embodiment, the cementitious material for use with the present invention comprises 0% to approximately 80% by weight portland cement, 0% to approximately 80% by weight slag cement, and approximately 20% to approximately 90% by weight fly ash.

In one disclosed embodiment, the cementitious material for use with the present invention comprises 0% to approximately 80% by weight portland cement, 0% to approximately 80% by weight slag cement, and approximately 20% to approximately 90% by weight volcanic ash.

In one disclosed embodiment, the cementitious material for use with the present invention comprises 0% to approximately 80% by weight portland cement, 0% to approximately 80% by weight slag cement, and approximately 20% to approximately 90% by weight silica fume.

In one disclosed embodiment, the cementitious material for use with the present invention comprises approximately 5% to approximately 95% by weight one or more pozzolans and approximately 1% to approximately 25% by weight calcium hydroxide.

In one disclosed embodiment, the cementitious material for use with the present invention comprises approximately 5% to approximately 75% by weight one or more pozzolans and approximately 1% to approximately 25% by weight calcium hydroxide.

In one disclosed embodiment, the cementitious material for use with the present invention comprises approximately 5% to approximately 95% by weight one or more pozzolans and approximately 1% to approximately 25% by weight calcium oxide, calcium hydroxide, or latex or polymer admixtures, either mineral or synthetic, that have reactive hydroxyl groups, or mixtures thereof.

In one disclosed embodiment, the cementitious material for use with the present invention comprises approximately 5% to approximately 75% by weight one or more pozzolans and approximately 1% to approximately 25% by weight calcium oxide, calcium hydroxide, or latex or polymer admixtures, either mineral or synthetic, that have reactive hydroxyl groups, or mixtures thereof.

In one disclosed embodiment, the cementitious material for use with the present invention comprises 0% to approximately 80% by weight portland cement, 0% to approximately 80% by weight slag cement, and approximately 5% to approximately 40% by weight silica fume.

In one disclosed embodiment, the cementitious material for use with the present invention comprises approximately 5% to approximately 95% by weight one or more pozzolans and approximately 1% to approximately 25% by weight lime.

In one disclosed embodiment, the cementitious material for use with the present invention comprises approximately 5% to approximately 75% by weight one or more pozzolans and approximately 1% to approximately 25% by weight lime.

In one disclosed embodiment, the cementitious material for use with the present invention comprises approximately 5% to approximately 95% by weight one or more pozzolans and approximately 1% to approximately 25% by weight of a compound that produces calcium hydroxide in the presence of water such that the calcium hydroxide reacts with the one or more pozzolans to form a cementitious material.

In another disclosed embodiment, the cementitious material for use with the present invention comprises approximately 10% to approximately 80% by weight portland cement and the remaining cementitious material comprising one or more supplementary cementitious materials selected from slag cement and fly ash. In another disclosed embodiment, the cementitious material for use with the present invention comprises approximately 10% to approximately 70% by weight portland cement and the remaining cementitious material comprising one or more supplementary cementitious materials selected from slag cement and fly ash. In another disclosed embodiment, the cementitious material for use with the present invention comprises approximately 10% to approximately 60% by weight portland cement and the remaining cementitious material comprising one or more supplementary cementitious materials selected from slag cement and fly ash. In another disclosed embodiment, the cementitious material for use with the present invention comprises approximately 10% to approximately 50% by weight portland cement and the remaining cementitious material comprising one or more supplementary cementitious materials selected from slag cement and fly ash.

In another disclosed embodiment, the cementitious material for use with the present invention comprises approximately 10% to approximately 80% by weight portland cement and the remaining cementitious material comprising one or more supplementary cementitious materials selected from slag cement, fly ash, silica fume, rice husk ash, metakaolin, and other siliceous, aluminous or aluminosiliceous materials that react with calcium hydroxide in the presence of water. In another disclosed embodiment, the cementitious material for use with the present invention comprises approximately 10% to approximately 70% by weight portland cement and the remaining cementitious material comprising one or more supplementary cementitious materials selected from slag cement, fly ash, silica fume, rice husk ash, metakaolin, and other siliceous, aluminous or aluminosiliceous materials that react with calcium hydroxide in the presence of water. In another disclosed embodiment, the cementitious material for use with the present invention comprises approximately 10% to approximately 60% by weight portland cement and the remaining cementitious material comprising one or more supplementary cementitious materials selected from slag cement, fly ash, silica fume, rice husk ash, metakaolin, and other siliceous, aluminous or aluminosiliceous materials that react with calcium hydroxide in the presence of water. In another disclosed embodiment, the cementitious material for use with the present invention comprises approximately 10% to approximately 50% by weight portland cement and the remaining cementitious material comprising one or more supplementary cementitious materials selected from slag cement, fly ash, silica fume, rice husk ash, metakaolin, and other siliceous, aluminous or aluminosiliceous materials that react with calcium hydroxide in the presence of water.

In another disclosed embodiment, the cementitious material for use with the present invention comprises approximately 10% to approximately 80% by weight portland cement and the remaining cementitious material comprising one or more pozzolanic materials. In another disclosed embodiment, the cementitious material for use with the present invention comprises approximately 10% to approximately 70% by weight portland cement and the remaining cementitious material comprising one or more pozzolanic materials. In another disclosed embodiment, the cementitious material for use with the present invention comprises approximately 10% to approximately 60% by weight portland cement and the remaining cementitious material comprising one or more pozzolanic materials. In another disclosed embodiment, the cementitious material for use with the present invention comprises approximately 10% to approximately 50% by weight portland cement and the remaining cementitious material comprising one or more pozzolanic materials. In another disclosed embodiment, the foregoing cementitious materials further comprise approximately 0.1% to approximately 10% by weight Wollastonite.

In another disclosed embodiment, the cementitious material for use with the present invention comprises one or more pozzolans and a sufficient amount of calcium hydroxide, or a compound that produces calcium hydroxide in the presence of water such that the calcium hydroxide reacts with the one or more pozzolans to form a cementitious material.

In another disclosed embodiment, the cementitious material for use with the present invention comprises one or more hydraulic cements and one or more pozzolans, wherein the one or more hydraulic cements are in an amount sufficient to produces calcium hydroxide in the presence of water sufficient to react with the one or more pozzolans to form a supplementary cementitious material.

In another disclosed embodiment, the cementitious material for use with the present invention comprises one or more hydraulic cements and volcanic ash, wherein the one or more hydraulic cements are in an amount sufficient to produces calcium hydroxide in the presence of water sufficient to react with the volcanic ash to form a supplementary cementitious material.

In another disclosed embodiment, the cementitious material for use with the present invention comprises one or more hydraulic cements and rice husk ash, wherein the one or more hydraulic cements are in an amount sufficient to produces calcium hydroxide in the presence of water sufficient to react with the rice husk ash to form a supplementary cementitious material In another disclosed embodiment, the cementitious material for use with the present invention comprises one or more hydraulic cements and metakaolin, wherein the one or more hydraulic cements are in an amount sufficient to produces calcium hydroxide in the presence of water sufficient to react with the metakaolin to form a supplementary cementitious material.

In another disclosed embodiment, the cementitious material for use with the present invention comprises one or more hydraulic cements and silica fume, wherein the one or more hydraulic cements are in an amount sufficient to produces calcium hydroxide in the presence of water sufficient to react with the silica fume to form a supplementary cementitious material.

In another disclosed embodiment, the cementitious material for use with the present invention comprises portland cement and one or more pozzolans, wherein the portland cement is in an amount sufficient to produces calcium hydroxide in the presence of water sufficient to react with the one or more pozzolans to form a supplementary cementitious material.

In another disclosed embodiment, the cementitious material for use with the present invention comprises portland cement, slag cement and one or more pozzolans, wherein the portland cement and slag cement are in an amounts sufficient to produce calcium hydroxide in the presence of water sufficient to react with the one or more pozzolans to form a supplementary cementitious material.

The portland cement, slag cement and/or one or more pozzolans can be combined physically or mechanically in any suitable manner and is not a critical feature. For example, the portland cement, slag cement and/or one or more pozzolans can be mixed together to form a uniform blend of dry material prior to combining with the aggregate and water. Or, the portland cement, slag cement and/or one or more pozzolans can be added separately to a conventional concrete mixer, such as the transit mixer of a ready-mix concrete truck, at a batch plant. The water and aggregate can be added to the mixer before the cementitious material, however, it is preferable to add the cementitious material first, the water second, the aggregate third and any makeup water last.

Chemical admixtures can also be used with the preferred concrete for use with the present invention. Such chemical admixtures include, but are not limited to, accelerators, retarders, air entrainments, plasticizers, superplasticizers, coloring pigments, corrosion inhibitors, bonding agents and pumping aid. Although chemical admixtures can be used with the concrete of the present invention, it is believed that chemical admixtures are not necessary.

Mineral admixtures can also be used with the concrete of the present invention. Although mineral admixtures can be used with the concrete of the present invention, it is believed that mineral admixtures are not necessary. However, in some embodiments it may be desirable to include a water reducing admixture, such as a superplasticizer.

The concrete mix cured in an insulated concrete form in accordance with the present invention, produces concrete with superior early strength and ultimate strength properties compared to the same concrete mix cured in a conventional form without the use of any chemical additives to accelerate or otherwise alter the curing process. Thus, in one disclosed embodiment of the present invention, the preferred cementitious material comprises at least two of portland cement, slag cement and fly ash in amounts such that at three to seven days the concrete mix cured in accordance with the present invention has a compressive strength at least 50% greater than the same concrete mix would have after the same amount of time in a conventional (i.e., non-insulated) concrete form under ambient conditions. In another disclosed embodiment, the preferred concrete mix cured in accordance with the present invention has a compressive strength at least 25%, at least 50%, at least 75%, at least 100%, at least 150%, at least 200%, at least 250% or at least 300% greater than the same concrete mix would have after the same amount of time in a conventional (i.e., non-insulated) concrete form under the same conditions.

In another disclosed embodiment of the present invention, the preferred cementitious material comprises portland cement, slag cement and fly ash in amounts such that at three to seven days the concrete mix cured in accordance with the present invention has a compressive strength at least 25% or at least 50% greater than the same concrete mix would have after three days in a conventional concrete form under ambient conditions. In another disclosed embodiment the preferred concrete mix cured in accordance with the present invention has a compressive strength at least 25%, at least 50%, at least 75%, at least 100%, at least 150%, at least 200%, at least 250% or at least 300% greater than the same concrete mix would have after the same amount of time in a conventional (i.e., non-insulated) concrete form under the same conditions.

In another disclosed embodiment of the present invention, the preferred cementitious material comprises portland cement and slag cement in amounts such that at three to seven days the concrete mix cured in accordance with the present invention has a compressive strength at least 25% or at least 50% greater than the same concrete mix would have after the same time period in a conventional concrete form under ambient conditions. In another disclosed embodiment, the preferred concrete mix cured in accordance with the present invention has a compressive strength at least 100%, at least 150%, at least 200%, at least 250% or at least 300% greater than the same concrete mix would have after the same amount of time in a conventional (i.e., non-insulated) concrete form under the same conditions.

In another disclosed embodiment of the present invention, the preferred cementitious material comprises portland cement and fly ash in amounts such that at three to seven days the concrete mix cured in accordance with the present invention has a compressive strength at least 25% or at least 50% greater than the same concrete mix would have after the same time period in a conventional concrete form under ambient conditions. In another disclosed embodiment the preferred concrete mix cured in accordance with the present invention has a compressive strength at least 100%, at least 150%, at least 200%, at least 250% or at least 300% greater than the same concrete mix would have after the same amount of time in a conventional (i.e., non-insulated) concrete form under the same conditions.

The present invention can also be used to accelerate the curing of high performance concrete mixes and ultra high performance concrete mixes.

It should be understood, of course, that the foregoing relates only to certain disclosed embodiments of the present invention and that numerous modifications or alterations may be made therein without departing from the spirit and scope of the invention.

What is claimed is:

1. A method comprising:
   placing a quantity of plastic concrete on a horizontal concrete forming deck comprising:
   a first concrete forming panel having a first primary surface adapted for forming and contacting plastic concrete and a second primary surface opposite the first primary surface, wherein the first concrete forming panel comprises wood, plywood, high density overlay (HDO) plywood, plastic, fiberglass board, resin board or metal;
   a first layer of insulating material contacting and substantially covering the second primary surface of the first concrete forming panel, wherein the first layer of insulating material has an R-value of greater than 4; and
   a second panel contacting and substantially covering the first layer of insulating material, the second panel having a primary surface opposite the first layer of insulating material; and
   a plurality of deck support members extending transversely with respect to the primary surface of the second panel;
   substantially covering the quantity of plastic concrete with a second layer of insulating material; and
   leaving the second layer of insulating material on the quantity of plastic concrete for a time sufficient for the quantity of plastic concrete to at least partially cure.

2. The method of claim 1, wherein the first layer of insulating material has an R-value of greater than 8.

3. The method of claim 1, wherein the second layer of insulating material has an R-value of greater than 1.5.

4. The method of claim 1, wherein the second layer of insulating material has an R-value of greater than 4.

5. The method of claim 1, wherein the second layer of insulating material has an R-value of greater than 8.

6. The method of claim 1, wherein the concrete form further comprises an electric heating element in thermal contact with the second primary surface of the first concrete forming panel.

7. The method of claim 1, wherein an electric heating element is disposed between the first concrete forming panel and the second panel.

8. The method of claim 1 further comprising removing the second layer of insulating material.

9. The method of claim 8 further comprising removing the horizontal concrete forming deck.

10. The method of claim 1, wherein the layer of insulating material comprises a polymeric foam of polyvinyl chloride, urethane, polyurethane, polyisocyanurate, phenol, polyethylene, polyimide or polystyrene.

11. A method comprising:
    placing a quantity of plastic concrete on a horizontal concrete forming deck comprising:
    an insulated panel having a primary surface, wherein the insulating panel comprises:
    a first panel of wood, plywood, high density overlay (HDO) plywood, plastic, fiberglass board, resin board or metal having a first primary surface and an opposite second primary surface, wherein the first panel contacts the plastic concrete;
    a first layer of polymeric foam insulating material contacting the second primary surface of the first panel, wherein the first layer of polymeric foam insulating material has an R-value of greater than 4; and
    a plurality of deck support members extending transversely with respect to the primary surface of the insulating panel;
    substantially covering the quantity of plastic concrete with a second layer of insulating material, wherein the second layer of insulating material has an R-value of greater than 4; and leaving the second layer of insulating material on the quantity of plastic concrete for a time sufficient for the quantity of plastic concrete to at least partially cure.

12. The method of claim 11, wherein the first layer of insulating material has an R-value of greater than 8.

13. The method of claim 12, wherein the second layer of insulating material has an R-value of greater than 4.

* * * * *